(12) United States Patent
Han et al.

(10) Patent No.: US 11,627,599 B2
(45) Date of Patent: Apr. 11, 2023

(54) METHOD AND APPARATUS FOR SIGNAL TRANSMISSION, AND TERMINAL

(71) Applicant: ZTE CORPORATION, Shenzhen (CN)

(72) Inventors: Xianghui Han, Shenzhen (CN); Shuqiang Xia, Shenzhen (CN); Jing Shi, Shenzhen (CN); Chunli Liang, Shenzhen (CN); Min Ren, Shenzhen (CN); Wei Lin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 67 days.

(21) Appl. No.: 17/054,484

(22) PCT Filed: Apr. 26, 2019

(86) PCT No.: PCT/CN2019/084664
§ 371 (c)(1),
(2) Date: Nov. 10, 2020

(87) PCT Pub. No.: WO2019/214468
PCT Pub. Date: Nov. 14, 2019

(65) Prior Publication Data
US 2021/0058922 A1 Feb. 25, 2021

(30) Foreign Application Priority Data
May 11, 2018 (CN) .......................... 201810451392.1

(51) Int. Cl.
*H04W 72/21* (2023.01)
*H04L 1/1812* (2023.01)
(Continued)

(52) U.S. Cl.
CPC .......... *H04W 72/21* (2023.01); *H04L 1/1812* (2013.01); *H04L 5/0055* (2013.01); *H04W 74/004* (2013.01)

(58) Field of Classification Search
CPC ......... H04W 72/0413; H04W 72/1284; H04W 74/004; H04W 72/1268; H04L 1/1812;
(Continued)

(56) References Cited

U.S. PATENT DOCUMENTS 9,497,756 B2   11/2016   Dinan
9,826,519 B2   11/2017   Dinan
(Continued)

FOREIGN PATENT DOCUMENTS

CN   101998585 A   3/2011
CN   102098086 A   6/2011
(Continued)

OTHER PUBLICATIONS

European Search Report received in European Application No. EP 19799672 dated Nov. 26, 2021 in 4 pages.
(Continued)

*Primary Examiner* — Sharmin Chowdhury
(74) *Attorney, Agent, or Firm* — Knobbe, Martens, Olson & Bear, LLP.

(57) ABSTRACT

Provided are a method and apparatus for signal transmission and a terminal. The method includes determining the sending mode of multiple uplink channels by a user equipment (UE) in a case where overlapped symbols of the uplink channels exist in time domain; and sending uplink signals carried by the uplink channels according to the determined sending mode.

17 Claims, 8 Drawing Sheets

(51) Int. Cl.
*H04L 5/00* (2006.01)
*H04W 74/00* (2009.01)

(58) Field of Classification Search
CPC ... H04L 5/0055; H04L 1/1664; H04L 1/1854; H04L 1/1858; H04L 1/1861; H04L 5/0053; H04L 5/0064; H04L 5/0044
See application file for complete search history.

(56) References Cited

U.S. PATENT DOCUMENTS

| | | | |
|---|---|---|---|
| 2013/0250882 A1 | 9/2013 | Dinan | |
| 2016/0374058 A1 | 12/2016 | Dinan | |
| 2017/0215157 A1 | 7/2017 | Yang et al. | |
| 2018/0034610 A1 | 2/2018 | He et al. | |
| 2018/0077692 A1 | 3/2018 | Dinan | |
| 2018/0368117 A1* | 12/2018 | Ying | H04L 1/16 |
| 2019/0045546 A1* | 2/2019 | Li | H04L 5/0073 |
| 2019/0320431 A1* | 10/2019 | Huang | H04L 5/0064 |
| 2020/0235865 A1* | 7/2020 | Takeda | H04W 72/12 |
| 2020/0351867 A1* | 11/2020 | Guo | H04L 1/0026 |
| 2021/0160901 A1* | 5/2021 | Takeda | H04L 5/0044 |
| 2021/0377991 A1* | 12/2021 | Takeda | H04W 72/1284 |

FOREIGN PATENT DOCUMENTS

| | | |
|---|---|---|
| CN | 102386963 A | 3/2012 |
| CN | 103220070 A | 7/2013 |
| CN | 103220768 A | 7/2013 |
| CN | 104935419 A | 9/2015 |
| CN | 104936300 A | 9/2015 |
| CN | 106067845 A | 11/2016 |
| CN | 107734688 A | 2/2018 |
| WO | WO 2013/100541 A1 | 7/2013 |
| WO | WO 2019/064549 A1 | 4/2019 |

OTHER PUBLICATIONS

"Implementation of LTE physical uplink based on directory GPP and research on channel estimation", 2014, Guangdong University of Technology in 4 pages.
First Office Action received in Japanese Application No. 2020-563760 dated Dec. 21, 2021 in 10 pages.
Milos, J. et al., "Simulation of UCI Transmission via PUCCH in LTE Uplink", 2014 24th International Conference Radioelektronika, Jun. 16, 2014, IEEE, pp. 1-4, doi: 10.1109/Radioelek.2014.6828430, in 1 page.
Multiplexing between PUCCH and PUSCH, LENOVO, Motorola Mobility, R1-1804213, 3GPP TSG RAN WG1 Meeting #92bis Sanya, China, Apr. 16-20, 2018 in 4 pages.
On Frequency Hopping for Ultra-reliable Transmission, Ericsson, R1-1803927, 3GPP TSG-RAN WG1 Meeting #92b Sanya, P.R. China, Apr. 16-20, 2018 in 4 pages.
Remaining details on UCI multiplexing, OPPO, R1-1802107, 3GPP TSG RAN WG1 Meeting #92 Athens, Greece, Feb. 26-Mar. 2, 2018 in 4 pages.
Remaining issues on UCI multiplexing, LG Electronics, R1-1804556, 3GPP TSG RAN WG1 Meeting #92bis Sanya, China, Apr. 16-20, 2018 in 6 pages.
Remaining issues on UL data transmission procedure, VIVO, R1-1803838, 3GPP TSG RAN WG1 Meeting #92bis Sanya, China, Apr. 16-20, 2018 in 6 pages.
Supplemental Search Report received in Chinese Application No. 2018104513921 dated Nov. 12, 2021 in 3 pages.
UCI multiplexing for URLLC, ZTE, SANECHIPS, R1-1804173, 3GPP TSG RAN WG1 Meeting #92bis Sanya, China, Apr. 16-20, 2018 in 3 pages.
UCI on PUSCH and UL channel multiplexing for NR, LG Electronics, R1-1719927, 3GPP TSG RAN WG1 Meeting 91 Reno, USA, Nov. 27-Dec. 1, 2017 in 17 pages.
UCI piggyback on PUSCH for URLLC, HUAWEI, HISILICON, RI-1804290, 3GPP TSG RAN WG1 Meeting #92bis Sanya, China, Apr. 16-20, 2018 in 9 pages.
UCI reporting on PUCCH and PUSCH, SHARP, R1-1708374, 3GPP TSG RAN WG1 Meeting #89 Hangzhou, P.R. China May 15-19, 2017 in 3 pages.
ZTE, Sanechips: "UCI multiplexing on PUSCH", Nov. 27-Dec. 1, 2017, 3GPP TSG RAN WG1 Meeting 91, R1-1719676.
First Search Report for CN 201810451392.1 dated Jun. 15, 2021.
First Office Action for CN 201810451392.1 dated Jun. 24, 2021.
International Search Report for PCT/CN2019/084664 dated Jul. 2, 2019.
Qualcomm Incorporated, R1-180100, remaining issues for multiplexing UCI on Pusch, 3GPP TSG RAN WG1 #AH, 3GPP server publication date (Jan. 24, 2018).
LG Electronics, R1-1719927, UCI on PUSCH and UL channel multiplexing for NR, 3GPP TSG RAN WG1 #91, 3GPP server publication date (Nov. 18, 2017).
Request for the Submission of an Opinion for Korean Patent Application No. 10-2020-7035681 dated Dec. 20, 2022.

* cited by examiner

METHOD AND APPARATUS FOR SIGNAL TRANSMISSION, AND TERMINAL

CROSS-REFERENCES TO RELATED APPLICATIONS

This application is a national stage application filed under 35 U.S.C. 371 based on International Patent Application No. PCT/CN2019/084664, filed on Apr. 26, 2019, which claims priority to Chinese Patent Application No. 201810451392.1 filed with the CNIPA on May 11, 2018, disclosures of which are incorporated herein by reference in their entireties.

TECHNICAL FIELD

The present disclosure relates to the field of data communication and, in particular, to a method and apparatus for signal transmission and a terminal.

BACKGROUND

In long term evolution (LTE)/LTE-Advanced (LTE-A) systems and the new-generation mobile communication system, namely, the fifth-generation (5G) mobile communication system, physical uplink control channel (PUCCH) is mainly used for carrying uplink control information (UCI) which includes hybrid automatic repeat request acknowledgement (HARQ-ACK) for downlink data, channel state information (CSI), scheduling request (SR), and so on; and physical uplink shared channel (PUSCH) is mainly used for carrying uplink data transmission.

When a user terminal needs to send PUCCH and PUSCH channels simultaneously, if the user terminal is able to support simultaneous transmission and the base station is configured for PUCCH and PUSCH simultaneous transmission, the user terminal sends PUCCH and PUSCH simultaneously. If the user terminal is not able to support simultaneous transmission or if the user terminal is able to support the simultaneous transmission, but the base station is not configured for simultaneous transmission, the uplink control information needs to be transmitted on a PUSCH channel.

In LTE subsequent evolution systems and a 5G system, a variety of traffic scenarios are supported, such as enhance mobile broadband (eMBB), ultra-reliable low latency communication (URLLC), and massive machine type of communication (mMTC).

URLLC traffic such as industrial automation, Internet of Vehicles, remote control, smart grid, virtual reality and so on has relatively higher priority. Therefore, there are scenarios where traffic of different types and different priority levels is sent simultaneously. For example, eMBB traffic carried by a PUSCH channel and URLLC control information carried by a PUCCH channel are sent simultaneously. At this time, the traditional rules for mapping the UCI onto a PUSCH channel is not applicable. Therefore, there is a need for a scheme for effective multiplexing of two or more channels carrying signals of different priority levels.

Meanwhile, in a 5G system, the starting point and the length of PUSCH and the starting point and the length of PUCCH in a transmission time unit (such as a time slot) may be dynamically adjusted, and there exists a situation where PUSCH and PUCCH partially overlap, for example, the channels have different starting points and different lengths. At this time, the conventional transmission scheme cannot be effectively supportive.

SUMMARY

To solve the preceding problems, the present disclosure provides a method and apparatus for signal transmission and a terminal, which are able to improve the latency and reliability index of low-latency and high-reliability information.

The present disclosure provides a method for signal transmission. The method includes determining the sending mode of multiple uplink channels by a user equipment (UE) in a case where overlapped symbols of the plurality of uplink channels exist in time domain; and sending uplink signals carried by the uplink channels according to the determined sending mode.

The present disclosure further provides an apparatus for signal transmission. The apparatus is disposed on a UE. The apparatus includes a channel overlap control unit configured to determine a sending mode of a plurality of uplink channels in a case where overlapped symbols of the plurality of uplink channels exist in time domain; and a sending unit configured to send uplink signals carried by the uplink channels according to the determined sending mode.

The present disclosure further provides a terminal. The terminal includes a memory, a processor and a computer program stored on the memory and capable of running on the processor. The processor performs processing of any method for signal transmission of the present disclosure when executing the computer program.

The present disclosure further provides a computer-readable storage medium, on which a computer program is stored. The computer program performs processing of any method for signal transmission of the present disclosure when the computer program is executed by a processor.

Compared with the related art, the technical solution provided by the present disclosure includes determining, by a UE, a sending mode of a plurality of uplink channels in a case where overlapped symbols of the plurality of uplink channels exist in time domain; and sending uplink signals carried by the plurality of uplink channels according to the determined sending mode. The solution of the present disclosure provides a multiplexing scheme for simultaneously sending traffic signal of different priority levels, thereby improving the latency and reliability index of low-latency and high-reliability information.

BRIEF DESCRIPTION OF DRAWINGS

Drawings in embodiments of the present disclosure are described below for a further understanding of the present disclosure. The drawings are used to explain the present disclosure in conjunction with the description and are not intended to limit the scope of the present disclosure.

DETAILED DESCRIPTION

To facilitate the understanding of those skilled in the art, the present disclosure is further described in detail in conjunction with embodiments. The embodiments are not intended to limit the scope of the present disclosure. It is to be noted that embodiments of the present disclosure and various manners in the embodiments can be combined with each other if there is no conflict.

Figure 1:
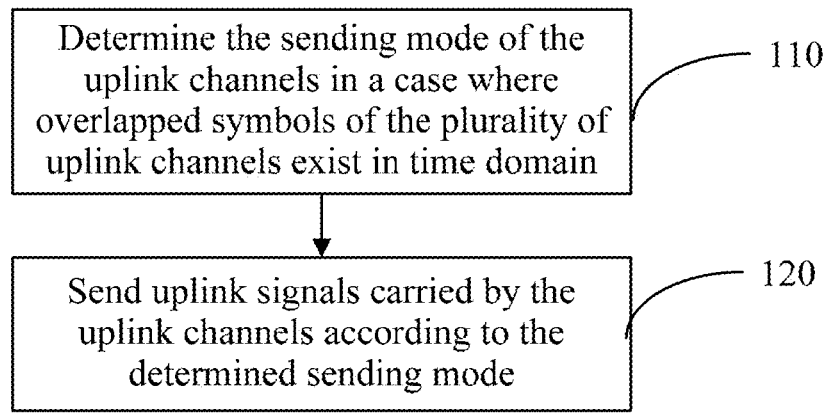
FIG. 1 is a flowchart of a method for signal transmission according to an embodiment of the present disclosure.

As shown in FIG. 1, the present disclosure provides a method for signal transmission. The method includes the steps below.

In step 110, in a case where overlapped symbols of a plurality of uplink channels exist in time domain, a UE determines a sending mode of the plurality of uplink channels.

In step 120, the UE sends uplink signals carried by the uplink channels according to the determined sending mode.

The present disclosure provides a method for signal transmission. The method is applicable to a scenario where overlapped symbols of one PUCCH and one PUSCH exist and the starting symbols of the PUCCH and the PUSCH in the time domain are different. The method includes the steps below.

In step 210, whether uplink control information (UCI) includes only an HARQ-ACK message is determined; if the UCI includes only the HARQ-ACK message, step 221 is performed; if the UCI does not include only the HARQ-ACK message, step 241 is performed.

In step 221, whether the length of the HARQ-ACK message is of 1 to 2 bits is determined; if the length of the HARQ-ACK message is of 1 to 2 bits, step 222 or 223 is performed; if the length of the HARQ-ACK message is not 1 to 2 bits, step 231 is performed.

In an example, step 222 is included after step 221. In step 222, in the case where the UCI includes a HARQ-ACK message with only 1 bit to 2 bits, the HARQ-ACK message is carried and sent on the PUSCH. The UCI here is sent on the PUSCH in a manner of puncturing.

In another example, step 223 is included after step 221. In step 223, the number of resources occupied by the HARQ-ACK message transmitted on the PUSCH is determined.

In step 224, in response to the number of resources occupied by the HARQ-ACK message transmitted on the PUSCH less than or equal to the threshold X1, the HARQ-ACK message is carried and sent on the PUSCH.

In step 225, in response to the number of resources occupied by the HARQ-ACK message transmitted on PUSCH greater than the threshold X1, the HARQ-ACK message is transmitted on the one PUCCH.

In step 231, in the case where the UCI contains only a HARQ-ACK message of more than 2 bits, the one PUCCH and one PUSCH are sent according to manner 1-1 or manner 1-2.

In manner 1-1, the HARQ-ACK message is bundled to 1 bit or 2 bits and carried and sent on the PUSCH.

In manner 1-2, PUCCH is sent, and the PUSCH is dropped.

In step 241, in the case where the UCI carried on the PUCCH contains an HARQ-ACK message and/or a CSI message and/or an SR message, the PUCCH is sent, and the PUSCH is dropped.

In a case where the UCI is sent on the PUSCH, the symbols that can be used for the UCI mapping are defined as non-demodulation reference signal (DMRS) symbols in the overlapped symbols of the PUCCH and the PUSCH.

In the case where the UCI is sent on the PUSCH, at least one of the following conditions should be satisfied: the starting symbol of the PUCCH is equal to the starting symbol of the PUSCH or the starting symbol of the PUCCH is X1 symbols earlier than the starting symbol of the PUSCH, and X1 is an integer greater than or equal to 1 and less than 14; the number of time domain symbols included in the PUCCH is equal to or less than the number of time domain symbols included in the PUSCH; the number of the overlapped symbols of the PUCCH and PUSCH is greater than a predetermined fixed value X2 or the number of non-DMRS symbols in the overlapped symbols of the PUCCH and PUSCH is greater than a predetermined fixed value X3; or the number of time domain symbols included in the PUSCH is greater than a predetermined fixed value X4.

Each of X1, X2, X3, X4 is an integer greater than or equal to 1 and less than 14.

In the case where the UCI message is sent on the PUCCH, at least one of the following conditions should be satisfied: the number of time domain symbols included in the PUCCH is equal to or less than the number of time domain symbols included in PUSCH; the starting symbol of the PUCCH is later than the starting symbol of the PUSCH; the priority of the traffic type corresponding to the PUCCH is higher than the priority of the traffic type corresponding to the PUSCH; or frequency domain resources used for sending the PUCCH are frequency domain resources of the PUSCH or a subset of the frequency domain resources of the PUSCH.

If frequency hopping of the PUCCH is enabled, the frequency domain resources used by the PUCCH are located on upper and lower resources in the frequency domain resources of the PUSCH.

The present disclosure provides a method for signal transmission. The method is applicable to a scenario where overlapped symbols of multiple PUCCHs and the one PUSCH exist in the time domain. The method includes at least one of the multiple PUCCHs is sent, and the PUSCH is dropped.

The number of symbols of at least one PUCCH in the multiple PUCCHs is equal to or less than the number of symbols of the PUSCH.

The priority of the traffic type corresponding to information carried by the PUCCH is higher than the traffic type corresponding to information carried by the PUSCH.

The present disclosure provides a method for signal transmission, and the method includes the steps below.

In step 301, a UE receives the scheduling of PUSCH about a first traffic type data in t1 period, and the PUSCH corresponding to the uplink scheduling needs to be sent on the uplink tn. A UE receives PDSCH carrying the second traffic type traffic in t2 period, and HARQ-ACK feedback corresponding to the PDSCH needs to be sent on the uplink slot tn.

In step 302, the sequence relationship between t1 period and t2 period is confirmed, and in the case where t1 period is after t2 period or the two are the same, step 303 is performed, and in the case where t1 period is before t2 period, step 304 is performed.

In step 303, in the case where t1 period is located after t2 period or the two are the same, the UE, in tn period according to the first predetermined sending mode, sends HARQ-ACK feedback corresponding to the PDSCH and the PUSCH corresponding to the uplink scheduling.

In step 304, in the case where t1 period is before t2 period, the UE, in tn period according to the second predetermined sending mode, sends the HARQ-ACK feedback corresponding to the PDSCH and the PUSCH corresponding to the uplink scheduling.

The first sending mode includes at least one of the manners below.

In manner 1, the HARQ-ACK message in uplink data of a first traffic type is multiplexed in a manner of puncturing; or in manner 2, the HARQ-ACK message in uplink data of a first data type is multiplexed in a rate matching manner.

In manner 3, in the case where a resource number occupied by the HARQ-ACK message transmitted on the first data type is less than or equal to the threshold X1, a manner of puncturing or rate matching is used in the uplink data of the first data type. In the case where the number of resources occupied by the HARQ-ACK message transmitted on the first data type is greater than the threshold X1, on the overlapped symbols of the resource carrying the HARQ-ACK message and the uplink data channel of the first data type, the HARQ-ACK message is carried and sent on the PUCCH. Alternatively, in the case where the code rate of the HARQ-ACK message when transmitted on the first data type is less than or equal to the threshold X2, a manner of puncturing or rate matching is used in the uplink data of the first data type. In the case where the code rate of the HARQ-ACK message transmitted on the first data type is greater than the threshold X2, on the overlapped symbols of the resource carrying the HARQ-ACK message and the uplink data channel of the first data type, the HARQ-ACK message is carried and sent on the PUCCH. Preferably, the first sending mode includes the manner 1 and the manner 2. The manner 1 is used for transmission in the case where HARQ-ACK message is of 1 to 2 bits. The manner 2 is used for transmission in the case where HARQ-ACK message is greater than 2 bits.

In the embodiment of the present disclosure, the second sending mode includes at least one of the manners below.

In manner 1, the HARQ-ACK message is sent on the overlapped symbols of the resource carrying the HARQ-ACK message and the uplink data channel of the first data type, and discard the uplink data of the first data type on the overlapped symbols. Optionally, the HARQ-ACK message is carried and sent on PUCCH.

In manner 2, the HARQ-ACK message is scheduled by the base station to be sent on symbols of an uplink data channel other than the first data type. Alternatively, the HARQ-ACK message is carried on a PUCCH or PUSCH channel, and the uplink data channel of the first data type and the PUCCH or PUSCH channel are time-division multiplexed.

In the embodiment of the present disclosure, the frequency domain resource for sending the HARQ-ACK message is the frequency domain resource of the uplink data of the first data type or a subset of the frequency domain resource of the uplink data of the first data type.

Based on the same or similar ideas as the preceding embodiments, the present disclosure further provides a method for signal transmission, and the method includes the steps below.

In step 201, the uplink scheduling of the PUSCH of the first data type, PDSCH of the second data type, and PDSCH of the first data type are received by UE, where UCI message corresponding to the PDSCH of the second data type, UCI message corresponding to the PDSCH of the first data type, and the PUSCH corresponding to the uplink scheduling need to be sent at the same period.

In step 202, PUSCH region is divided into the first region and the second region by the UE, UCI corresponding to PDSCH of the first data type is mapped in the first region, and UCI message corresponding to PDSCH of the second data type is mapped in the second region.

It is described in conjunction with the specific implementation scenarios herein.

Embodiment One

Figure 2A:
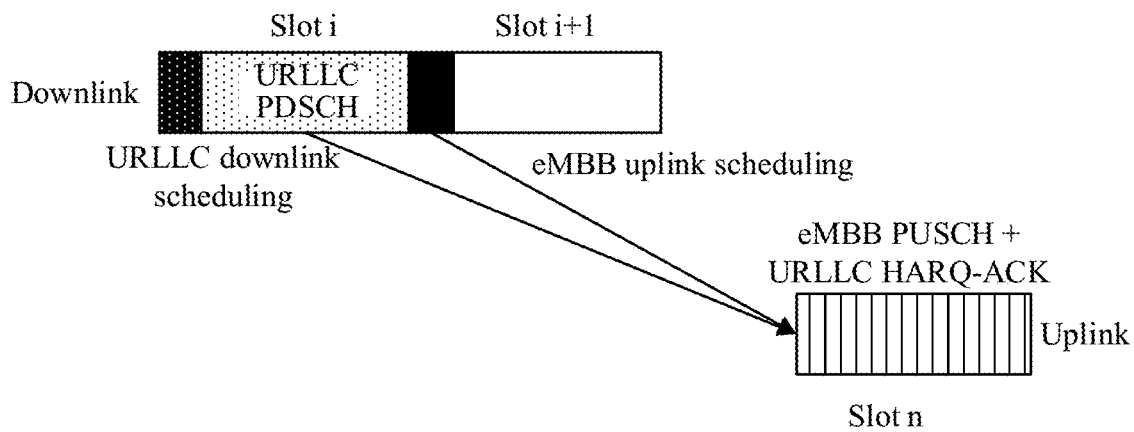
FIG. 2A illustrates a schematic diagram in which a terminal simultaneously sends eMBB PUSCH and URLLC HARQ-ACK according to an embodiment of the present disclosure.

FIG. 2A illustrates a schematic diagram in which eMBB uplink traffic scheduling is after URLLC downlink traffic transmission. In the figure, the base station sends PDSCH carrying the URLLC traffic in the downlink slot #i, and the HARQ-ACK feedback corresponding to the PDSCH is sent in the uplink time slot #n. At slot #i+1, the base station schedules sending of the PUSCH on uplink slot #n, and the PUSCH carries eMBB data.

If eMBB uplink traffic scheduling is after URLLC downlink traffic transmission, URLLC HARQ-ACK is mapped to eMBB PUSCH in a form of puncturing or rate matching for sending.

During puncturing or rate matching, the number of HARQ-ACK information bits for puncturing or rate matching is the number of HARQ-ACK bits that need to be fed back initially multiplied by a base station indication parameter Beta_offset. Generally, puncturing refers to replacing part or all of PUSCH data information with HARQ-ACK information. Rate matching refers to concatenating part or all of HARQ-ACK information and part or all of PUSCH information.

Figure 2B:
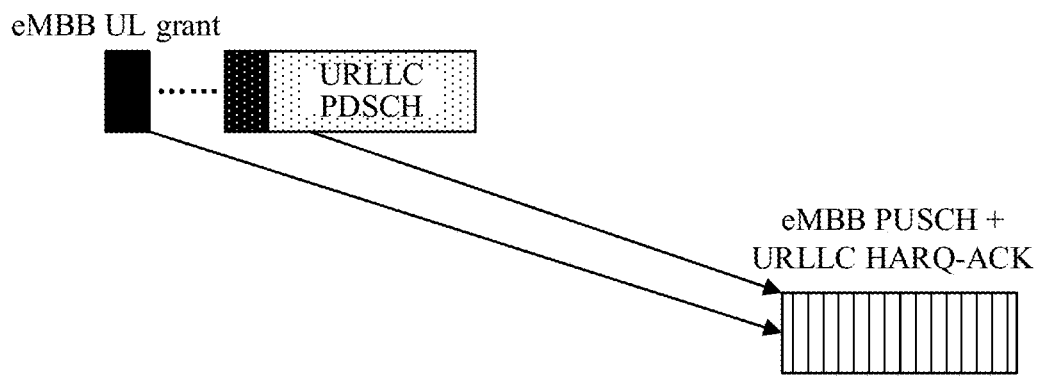
FIG. 2B illustrates a schematic diagram in which a terminal simultaneously sends eMBB PUSCH and URLLC HARQ-ACK according to an embodiment of the present disclosure.

FIG. 2B illustrates a schematic diagram in which eMBB uplink traffic scheduling is before URLLC downlink traffic transmission. Moreover, PUSCH of eMBB conflicts with the time domain position for sending URLLC HARQ-ACK.

If eMBB uplink traffic scheduling is before URLLC downlink traffic transmission, URLLC HARQ-ACK is time-division multiplexed with eMBB PUSCH or symbols that conflict with eMBB PUSCH are removed from URLLC UCI.

The time domain resource corresponding to the eMBB PUSCH sending and the time domain resource corresponding to the URLLC HARQ-ACK sending are in conflict. For example, eMBB PUSCH and PUCCH carrying URLLC HARQ-ACK have the same starting symbol but different lengths, have different starting points and different lengths, or have different starting points but the same length.

Herein eMBB PUSCH and URLLC HARQ-ACK are used as examples, but the sent signals in conflict may be eMBB PUSCH and URLLC CSI, may be eMBB PUSCH, eMBB UCI and URLLC HARQ-ACK, may be eMBB PUSCH, URLLC HARQ-ACK and URLLC CSI, or may be eMBB PUSCH, eMBB UCI, URLLC HARQ-ACK and URLLC CSI. The eMBB UCI may be eMBB HARQ-ACK and/or eMBB CSI.

Embodiment Two

Figure 3:
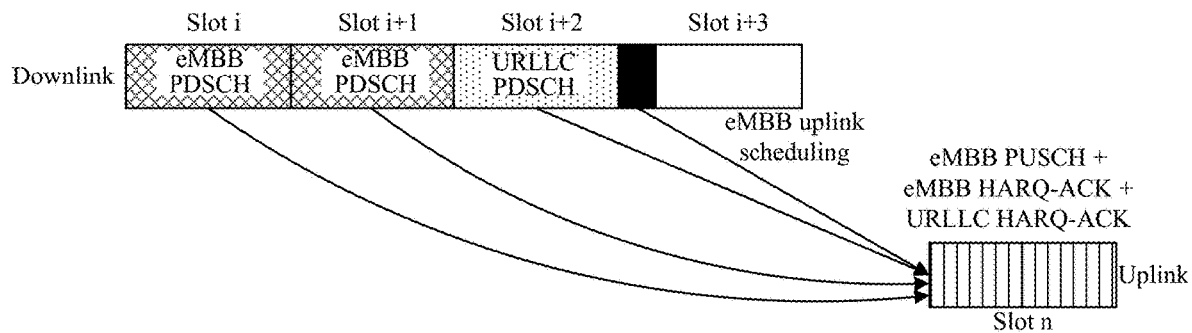
FIG. 3 illustrates a schematic diagram in which a terminal simultaneously sends eMBB PUSCH, eMBB HARQ-ACK and URLLC HARQ-ACK according to an embodiment of the present disclosure.

FIG. 3 illustrates a schematic diagram 2A in which a terminal simultaneously sends eMBB PUSCH, eMBB HARQ-ACK and URLLC HARQ-ACK. In the figure, at slot #i+3, the base station schedules sending of the PUSCH on uplink slot #n, and the PUSCH carries eMBB data. In downlink slot #i and slot #i+1, there is a PDSCH carrying eMBB, and the HARQ-ACK feedback corresponding to the PDSCH is sent in the uplink slot #n. There is a PDSCH carrying URLLC traffic in downlink slot #i+2, and the corresponding HARQ-ACK feedback is also sent on uplink slot #n. The multiple downlink PDSCHs may exist in one or more downlink slots.

Figure 4:
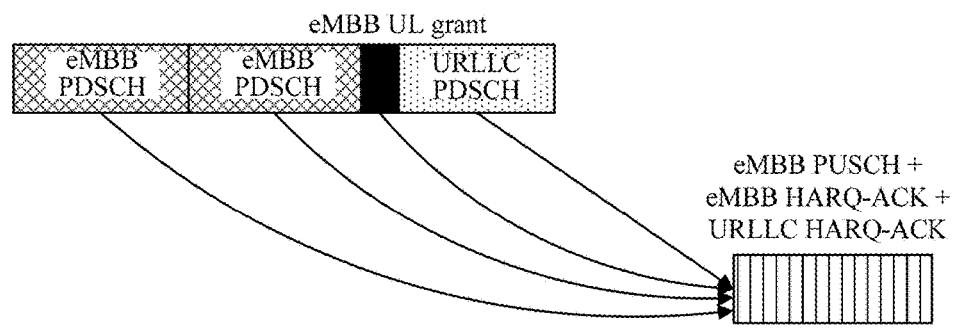
FIG. 4 illustrates a schematic diagram in which a terminal simultaneously sends eMBB PUSCH, eMBB HARQ-ACK and URLLC HARQ-ACK according to an embodiment of the present disclosure.
Figure 5A:
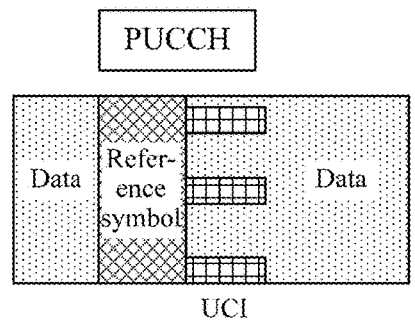
FIG. 5A, FIG. 5B, FIG. 5C and FIG. 5D are each a schematic diagram in which a terminal simultaneously sends PUSCH and PUCCH according to an embodiment of the present disclosure.
Figure 5B:
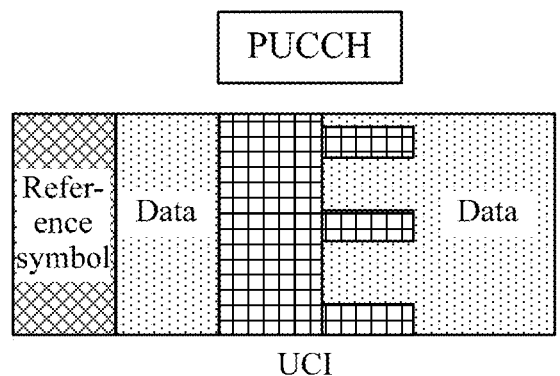
Figure 5C:
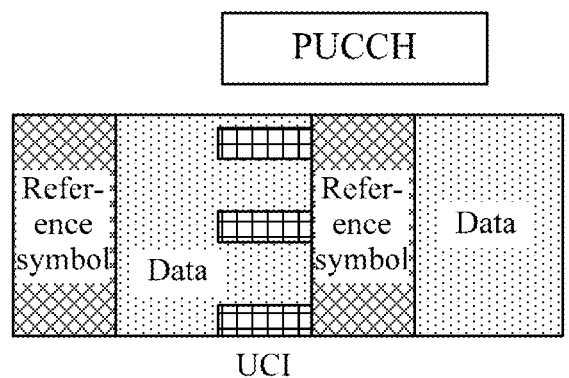
Figure 5D:
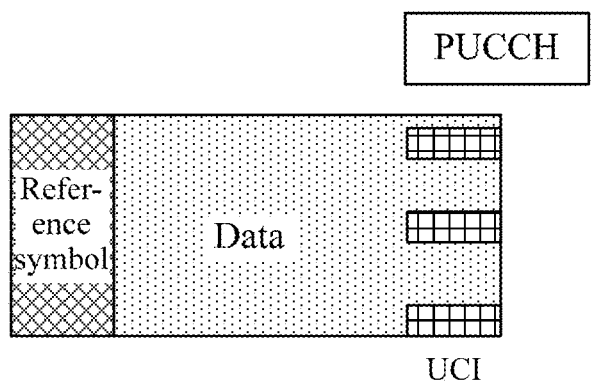

FIG. 4 illustrates a schematic diagram in which a terminal simultaneously sends eMBB PUSCH, eMBB HARQ-ACK and URLLC HARQ-ACK. The difference between FIG. 3 and FIG. 4 is that in FIG. 3, the eMBB uplink traffic scheduling is after the URLLC downlink traffic transmission, while in FIG. 4 eMBB uplink traffic scheduling is before URLLC downlink traffic transmission.

In embodiment one and embodiment two, the control channel for scheduling uplink data transmission of the first data type is located in t1 period, and the control channel scheduling downlink data transmission of the second traffic type or downlink data transmission of the second traffic type is in t2 period. In the case where t1 is after t2, a user terminal transmits HARQ-ACK information for downlink data transmission of the second traffic type by a first predetermined method. In the case where t1 is before t2, the user terminal transmits HARQ-ACK information for downlink data transmission of the second traffic type using a second predetermined method.

The first predetermined method is different from the second predetermined method.

In the case where t1 period and t2 period are the same, a user terminal send HARQ-ACK information for downlink data transmission of the second traffic type by using a first predetermined method.

In an embodiment, the first predetermined method includes but is not limited to one of the methods below.

The HARQ-ACK message is multiplexed in uplink data of the first data type in a manner of puncturing; or the HARQ-ACK message is multiplexed in uplink data of the first data type in a rate matching manner.

In an embodiment, the manner of puncturing is applicable to 1 to 2-bit HARQ-ACK messages or the case where PUCCH starting symbol configured for sending a HARQ-ACK message is the same as a starting symbol of the uplink data channel (i.e., the PUSCH) of the first data type.

In an embodiment, the rate matching manner is applicable to HARQ-ACK messages with more than 2 bits or is applicable to a PUCCH starting symbol configured to send HARQ-ACK message is different from a starting symbol of uplink data channel, PUSCH, of the first data type.

In an embodiment, the second predetermined method includes but is not limited to one of the methods below: sending the HARQ-ACK message on the overlapped symbols of the HARQ-ACK message and the uplink data of the first data type, and the uplink data of the first data type on the overlapped symbols is dropped.

In an embodiment, the frequency domain resource for sending the HARQ-ACK message is the frequency domain resource of the uplink data of the first data type or a subset of the frequency domain resource of the uplink data of the first data type.

The priority of the first data type is lower than the priority of the second data type.

In an embodiment, the first data type is eMBB traffic, and the second data type is URLLC traffic.

Embodiment Three

In FIG. 5, the PUSCH and the PUCCH have different time domain starting points and the PUSCH is not enabled for frequency hopping. At this time, the PUCCH channel is dropped and the UCI carried by the PUCCH channel is sent on the PUSCH channel. At this time, the first symbol that can be mapped by the UCI is defined as the first data symbol in the overlapped symbols of the PUCCH and the PUSCH or the first non-DMRS symbol of the PUSCH starting from PUCCH starting symbol. In the figure, the UCI is mapped on continuous or spaced resource elements on PUSCH. The UCI in the figure can be 1 to 2 bits of HARQ-ACK or CSI information.

The number of resources, to which the HARQ-ACK is mapped, on each layer of PUSCH is defined as $Q'_{ACK}=\min\{X,Y\}$, where X is the number of required resources determined by the number of bits of the HARQ-ACK, the offset value Beta_offset configured by the high layer, the PUSCH code rate and other factors, and Y is the maximum number of actual resources that a UE can multiplex.

$$Y = \left\lceil \alpha \cdot \sum_{l=l_0}^{N_{symb,all}^{PUCCH}-1} M_{sc}^{UCI}(l) \right\rceil$$

is defined, where $\alpha$ is a high-layer configuration parameter, or a default fixed value, or a value notified by DCI.

In an embodiment, $M_{sc}^{UCI}(l)$ is the number of resource elements that can be used to send UCI on symbol l. l=0, 1, 2, ..., $N_{symb,all}^{PUSCH}-1$ is a symbol index of PUSCH, and $N_{symb,all}^{PUSCH}$ is a total number of symbols of PUSCH, including DMRS symbols. $N_{symb,all}^{PUSCH}$ is a total number of symbols of PUCCH.

In an embodiment, for the DMRS symbol $M_{sc}^{UCI}(l)=0$ of PUSCH, other symbols, $M_{sc}^{UCI}(l)=M_{sc}^{PUSCH}-M_{sc}^{PT-RS}(l)$ or, $M_{sc}^{UCI}(l)=M_{sc}^{PUSCH}$, where $M_{sc}^{PUSCH}$ is the number of subcarriers in a PUSCH scheduling bandwidth, $M_{sc}^{PT-RS}(l)$ is the number of subcarriers including PTRS in symbol l.

In an embodiment, $l_0$ is an index of a non-DMRS symbol of PUSCH corresponding to the first symbol of PUCCH, or $l_0$ is an index of PUSCH symbol corresponding to the first symbol of PUCCH. Alternatively, $l_0$ is an index of the non-DMRS symbol of PUSCH corresponding to the first symbol of PUCCH, and the symbol is located after the first DMRS symbol of PUSCH.

In an embodiment, if the PUSCH carries eMBB data and PUCCH carries URLLC UCI, to ensure the latency, the UCI can only be mapped onto non-DMRS symbols in the overlapped symbols of PUCCH and PUSCH. Alternatively, the UCI can be mapped to a non-DMRS symbol after overlapped symbols of PUCCH and PUSCH.

Figure 6:
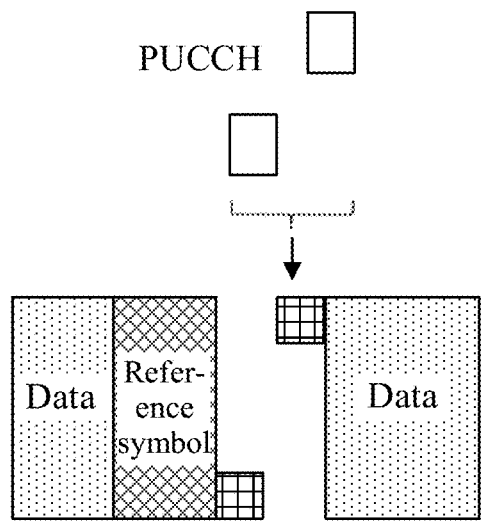
FIG. 6 illustrates another schematic diagram in which a terminal simultaneously sends PUSCH and PUCCH according to an embodiment of the present disclosure.

If the PUCCH has only one symbol, an entire symbol of the PUSCH may be removed for the PUCCH, that is, the PUCCH is sent on overlapped symbols. In FIG. 6, PUSCH symbol on the overlapped symbols is dropped, and PUCCH is sent on the resource of the PUSCH. In the figure, frequency hopping of the PUCCH is enabled. In the case where the PUCCH is sent on the PUSCH resource, the two frequency hopping resources are located on both sides of resource allocated for the PUSCH.

In the embodiment of the present disclosure, in the case where PUSCH and PUCCH time domain symbols conflict and starting symbols are different, sending method of UCI is determined according to at least one of: UCI type; and bit number of UCI.

In the case where UCI contains only a 1-bit to 2-bit HARQ-ACK message, the HARQ-ACK message is carried and sent on the PUSCH. In an embodiment, optionally, it is sent on PUSCH in a manner of puncturing. Alternatively, in the case where the number of resources occupied by the HARQ-ACK message transmitted on the first data type is less than or equal to the threshold X1, puncturing or rate matching is used in the uplink data of the first data type. In the case where the number of resources occupied by the HARQ-ACK message transmitted on the first data type is greater than the threshold X1, on the overlapped symbols of the resource carrying the HARQ-ACK message and uplink data channel of the first data type, the HARQ-ACK message is carried and sent on the PUCCH. Alternatively, in the case where the code rate of the HARQ-ACK message transmitted on the first data type is less than or equal to the threshold X2, puncturing or rate matching is used in the uplink data of the first data type. In the case where the code rate of the HARQ-ACK message transmitted on the first data type is greater than the threshold X2, on the overlapped symbols of the resource carrying the HARQ-ACK message and the uplink data channel of the first data type, the HARQ-ACK message is carried and sent on the PUCCH.

In the case where the UCI contains only an HARQ-ACK message of more than 2 bits, the HARQ-ACK message is bundled to 1 bit or 2 bits and carried and sent on the PUSCH. In an embodiment, optionally, it is sent on PUSCH in a manner of puncturing. Alternatively, in the case where the number of resources occupied by the bundled HARQ-ACK message transmitted on the first data type is less than or equal to the threshold X1, puncturing or rate matching is used in the uplink data of the first data type. In the case where the number of resources of the HARQ-ACK message transmitted on the first data type is greater than the threshold X1, on the overlapped symbols of the resource carrying the HARQ-ACK message and the uplink data channel of the first data type, the HARQ-ACK message is carried and sent on the PUCCH. Alternatively, in the case where the code rate of the HARQ-ACK message transmitted on the first data type is less than or equal to the threshold X2, puncturing or rate matching is used in the uplink data of the first data type. In the case where the code rate of the HARQ-ACK message transmitted on the first data type is greater than the threshold X2, on the overlapped symbols of the resource carrying the HARQ-ACK message and the uplink data channel of the first data type, the HARQ-ACK message is carried and sent on the PUCCH.

In the case where the UCI contains an HARQ-ACK message and/or a CSI message and/or an SR message, on overlapped symbols, the UCI message is sent on PUCCH. In an embodiment, the PUSCH transmission on the overlapped symbols is dropped; or, the HARQ-ACK message is carried and sent on the PUSCH. In an embodiment, optionally, the HARQ-ACK message is sent on PUSCH in a manner of puncturing. In an embodiment, the HARQ-ACK message is of 1 or 2 bits. CSI and/or SR messages are dropped.

In an embodiment, in the case where UCI is sent on PUSCH, it can be configured that the first symbol to which the UCI mapped is defined as the first data symbol in the overlapped symbols of PUCCH and PUSCH or the first non-DMRS symbol of PUSCH starting from the starting symbol of the PUCCH.

In an embodiment, the UCI can only be mapped onto non-DMRS symbols in the overlapped symbols of PUCCH and PUSCH.

In an embodiment, the UCI can be mapped to a non-DMRS symbol after the overlapped symbols of PUCCH and PUSCH. In an embodiment, the number of PUCCH symbol is 1 at this time.

The UCI is HARQ-ACK information of 1 to 2 bits.

In an embodiment, in the case where on overlapped symbols, the UCI message is sent on PUCCH, the frequency domain resources used by the PUCCH are PUSCH frequency domain resources or a subset of PUSCH frequency domain resources.

In an embodiment, if frequency hopping of the PUCCH is enabled, the frequency domain resources used by PUCCH are located on the upper and lower resources in frequency domain resources of the PUSCH.

In an embodiment, the frequency domain resource used by the PUCCH is frequency domain resource of PUCCH.

The UCI is HARQ-ACK information of greater than 2 bits or CSI information or one or more SR messages or a combination of the foregoing information.

Embodiment Four

FIG. 7 illustrates a schematic diagram in the case where PUSCH and PUCCH have different starting points and frequency hopping of the PUSCH is enabled. In the figure, the time domain of the PUCCH conflicts with frequency hops of the two PUSCHs. The PUSCH carries the data of low-priority traffic such as eMBB.

In the case where the PUCCH carries high-priority traffic such as HARQ-ACK information of URLLC, the mapping rules include: in rule 1, PUCCH channel is dropped, and the HARQ-ACK information is mapped into the second hop.

Figure 7A:
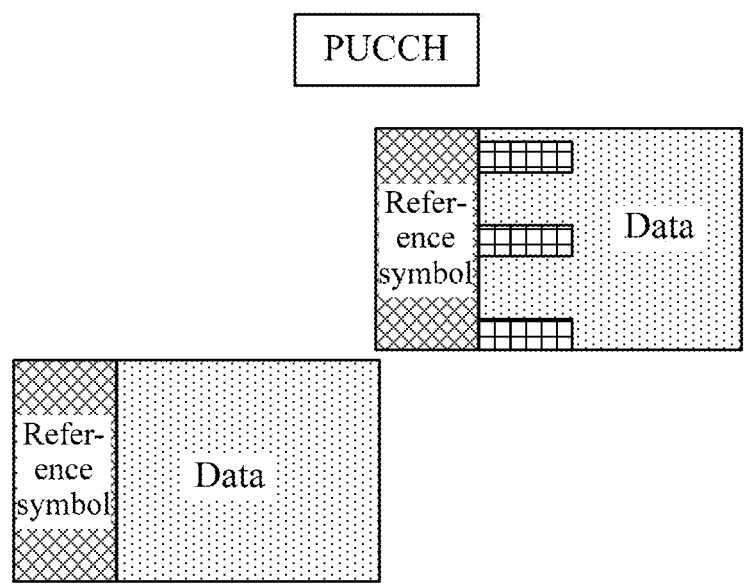
FIG. 7A, FIG. 7B and FIG. 7C are each a schematic diagram in which a terminal simultaneously sends PUSCH and PUCCH according to an embodiment of the present disclosure.

As illustrated in FIG. 7A, it is a schematic diagram of mapping according to rule 1, and the advantage at this time is that it is relatively adjacent to DMRS, and the disadvantage is that a certain latency is introduced.

In rule 2, PUCCH channel is dropped, and the HARQ-ACK information is mapped into the first hop.

Figure 7B:
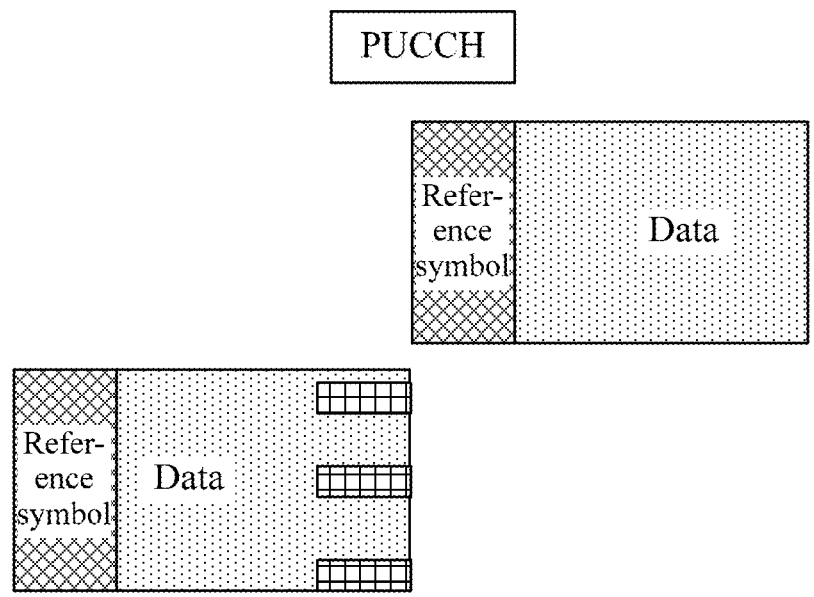

As illustrated in FIG. 7B, it is a schematic diagram of mapping according to rule 2, and the advantage is that a latency is small, but it is relatively far from DMRS.

In rule 3, the HARQ-ACK message is divided into two parts and the message is mapped into the two hops respectively.

Figure 7C:
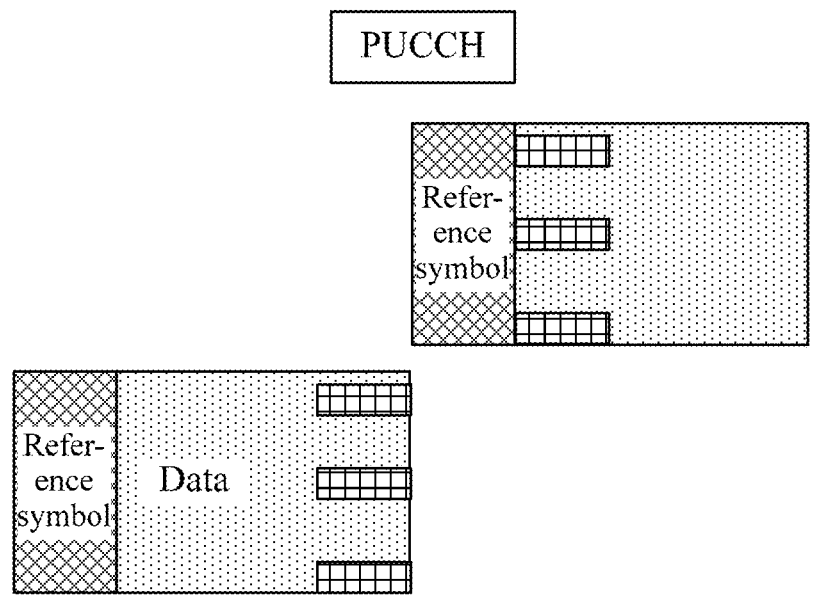

As illustrated in FIG. 7C, it is a schematic diagram of mapping according to rule 3.

In rule 4, the HARQ-ACK message is repeatedly mapped in the two hops, and the information mapped in the two hops is the same.

In rule 5, the information carried by the first hop of the PUCCH is mapped into the first hop of the PUSCH, and the information carried by the second hop of the PUCCH is mapped into the second hop of the PUSCH.

In rule 6, if frequency hopping of the PUCCH is enabled, the HARQ-ACK message is divided into two parts and mapped in the two hops respectively, and if frequency hopping of the PUCCH is not enabled, the HARQ-ACK message carried by the PUCCH is mapped to the first hop or the second hop.

In rule 7, according to the predetermined default value X, if the distance from overlapped symbols of PUCCH and PUSCH in the first hop of PUSCH to DMRS is less than or equal to X symbols, the HARQ-ACK message of the PUCCH is mapped into the first hop, otherwise, the HARQ-ACK message of the PUCCH is mapped into the second hop.

Multiple mapping rules for mapping HARQ-ACK information onto PUSCH may be defined in advance, and one of the preceding predefined rules is informed to a UE by a high layer through RRC, or a mapping rule is selected in an implicit manner.

Embodiment Five

Figure 8:
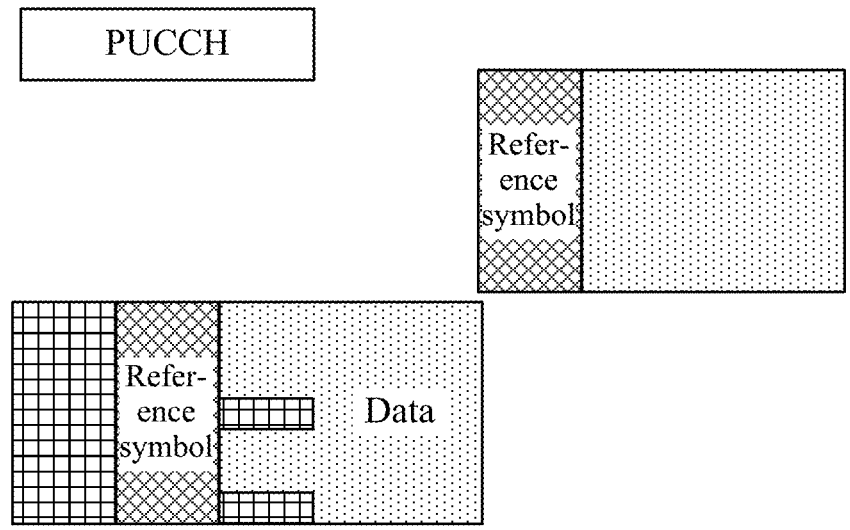
FIG. 8 illustrates a schematic diagram in which a terminal simultaneously sends PUSCH and PUCCH according to an embodiment of the present disclosure.

As illustrated in FIG. 8, the PUSCH and the PUCCH have the same starting point in time domain and frequency hopping of PUSCH is not enabled. In this case, PUCCH channel is dropped, and UCI carried by PUCCH is sent on PUSCH channel. At this time, the first symbol that UCI can map to is defined as the first data symbol in the overlapped symbols of PUCCH and PUSCH, or the first non-DMRS symbol of PUSCH starting from the PUCCH starting symbol. In the figure, UCI is mapped on continuous or spaced resource elements on PUSCH. The UCI may be HARQ-ACK or CSI information or SR message, or a combination of the foregoing information.

In an embodiment, if the PUCCH conflicts with only the first hop of PUSCH, UCI information is only mapped onto the first hop of PUSCH. If PUCCH conflicts with two hops of PUSCH, the UCI information is mapped onto non-DMRS symbols in the overlapped symbols. In an embodiment, optionally, the mapping sequence is from the first symbol to the overlapped symbols.

$Q'_{ACK} \leq Y$ is defined as the number resources, to which HARQ-ACK is mapped, on each layer of PUSCH, and Y is the maximum number of the resources that a UE can multiplex actually.

$$Y = \left\lceil \alpha \cdot \sum_{l=l_0}^{N_{symb,all}^{PUCCH}-1} M_{sc}^{UCI}(l) \right\rceil$$

is defined, where α is a high-layer configuration parameter, or a default fixed value, or the value notified by DCI.

In an embodiment, $M_{sc}^{UCI}(l)$ is the number of resource elements that can be configured to send UCI on symbol l. $l=0, 1, 2, \ldots, N_{symb,all}^{PUSCH}-1$ is the symbol index of PUSCH, and $N_{symb,all}^{PUSCH}$ is the total number of symbols of PUSCH, including DMRS symbols. $N_{symb,all}^{PUSCH}$ is the total number of symbols of PUCCH.

In an embodiment, for the DMRS symbol $M_{sc}^{UCI}(l)=0$ of PUSCH, other symbols, $M_{sc}^{UCI}(l)=M_{sc}^{PUSCH}-M_{sc}^{PT-RS}(l)$ or, $M_{sc}^{UCI}(l)=M_{sc}^{PUSCH}$, where $M_{sc}^{PUSCH}$ is the number of subcarriers in PUSCH scheduling bandwidth. $M_{sc}^{PT-RS}(l)$ is the number of subcarriers including PTRS in symbol l.

In an embodiment, $l_0$ is the index of the non-DMRS symbol of PUSCH corresponding to the first symbol of PUCCH, or $l_0$ is the index of the PUSCH symbol corresponding to the first symbol of PUCCH. Alternatively, $l_0$ is the index of the non-DMRS symbol of PUSCH corresponding to the first symbol of PUCCH, and the symbol is located after the first DMRS symbol of PUSCH.

In this embodiment, in the case where PUSCH and PUCCH time domain symbols conflict with each other and the starting symbols are the same, UCI sending mode is different from the manner which is adopted when PUSCH and PUCCH time domain symbols conflict with each other and the starting symbols are different.

Exemplarily, when the number of UCI bits is greater than two bits, or the UCI is HARQ-ACK information and/or CSI information and/or SR messages and is greater than two bits: in the case where PUSCH and PUCCH time domain symbols conflict and the starting symbols are the same, the UCI is carried and sent on the PUSCH in a rate matching manner; in the case where PUSCH and PUCCH time domain symbols conflict and the starting symbols are different, the UCI is carried and sent on the PUCCH.

Embodiment Six

Figure 9:
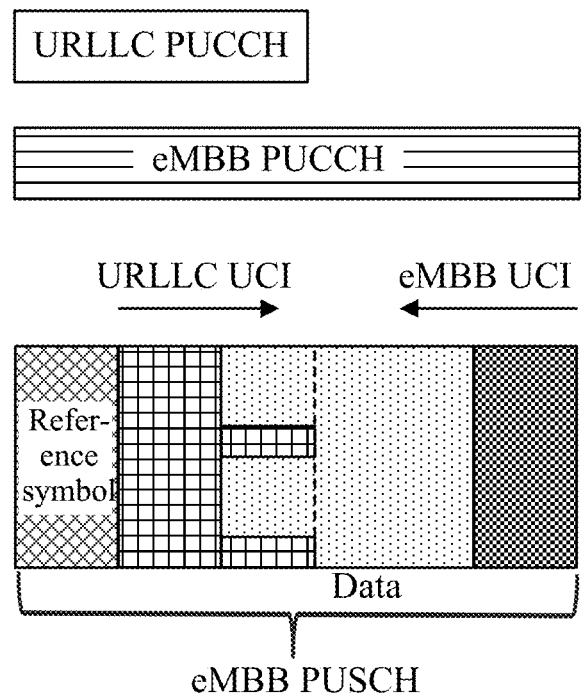
FIG. 9 illustrates a schematic diagram in which a terminal simultaneously sends eMBB PUSCH, eMBB PUCCH and URLLC PUCCH according to an embodiment of the present disclosure.

In FIG. 9, eMBB PUSCH, eMBB PUCCH and URLLC PUCCH have the same starting point. Optionally, PUSCH is divided into two regions, which are defined as the first region and the second region, where URLLC UCI can only be mapped onto the first region, and eMBB UCI can only be mapped onto the second region.

In an embodiment, the first region is an overlapped region of URLLC PUCCH and eMBB PUSCH, or non-DMRS symbols in an overlapped region of URLLC PUCCH and eMBB PUSCH. The second region is the symbols of PUSCH with the first region removed, or the second region is the symbols of PUSCH with the first region and the DMRS symbols removed.

The overlapped region refers to all frequency domain regions on the overlapped symbols of time domain.

In an embodiment, the first region is the first ceil (N/2) symbols of eMBB PUSCH, and the second region is the last floor (N/2) symbols of eMBB PUSCH, where N denotes the total number of symbols of PUSCH, the ceil function indicates rounding up, and the floor function indicates rounding down.

In an embodiment, the first region is the first ceil (N/2) non-DMRS symbols of eMBB PUSCH, and the second region is the last floor (N/2) non-DMRS symbols of eMBB PUSCH, where N is the total number of non-DMRS symbols of PUSCH, the ceil function indicates rounding up, and the floor function indicates rounding down.

In an embodiment, if frequency hopping of the PUSCH is enabled, the first region is the first frequency hopping position of the PUSCH, and the second region is the second frequency hopping position of the PUSCH.

In an embodiment, URLLC UCI is mapped to the first region in a manner of mapping to the symbols from the smallest symbol index to the largest symbol index; in an embodiment, eMBB UCI is mapped to the second region in a manner of mapping to the symbols from the largest symbol index to the smallest symbol index.

In an embodiment, the first predefined resource and the second predefined resource are respectively defined in the first and second regions. The first predefined resource is determined by URLLC HARQ-ACK of 1 or 2 bits, and the second predefined resource is determined by eMBB HARQ-ACK of 2 bits.

Optionally, a predefined resource is defined, where the predefined resource is determined by an N-bit UCI.

In an embodiment, the N=2, where URLLC HARQ-ACK occupies 1 bit, and eMBB HARQ-ACK occupies 1 bit.

The N=3, where URLLC HARQ-ACK occupies 1 bit, and eMBB HARQ-ACK occupies 2 bits; or the N=3, URLLC HARQ-ACK occupies 2 bits, and eMBB HARQ-ACK occupies 1 bit.

The N=4, where URLLC HARQ-ACK occupies 2 bits, and eMBB HARQ-ACK occupies 2 bits.

The first part of CSI (CSI part 1) of eMBB cannot be mapped on the preceding predefined resource; or the first part of CSI (CSI part 1) of eMBB can be mapped on the preceding predefined resource.

The second part of CSI (CSI part 2) of eMBB can be mapped on the preceding predefined resource.

The first part of CSI (CSI part 1) of URLLC cannot be mapped on the preceding predefined resource.

The second part of CSI (CSI part 2) of URLLC can be mapped on the preceding predefined resource; or the second part of CSI (CSI part 2) of URLLC cannot be mapped on the preceding predefined resource.

In an embodiment, in the case where the starting point of the time domain symbol of URLLC PUCCH is different from the starting point of the time domain symbol of eMBB PUSCH, if URLLC PUCCH carries an HARQ-ACK message of 1 to 2 bits, the HARQ-ACK is mapped on the PUSCH in a manner of puncturing. At this time, the starting point of eMBB PUCCH time domain symbol is the same as or different from the starting point of eMBB PUSCH time domain symbol.

In an embodiment, in the case where the starting point of the time domain symbol of URLLC PUCCH is different from the starting point of the time domain symbol of eMBB PUSCH, the overlapped PUSCH symbols are removed and URLLC PUCCH is sent.

The URLLC PUCCH carries an HARQ-ACK message, CSI information, or a combination of the foregoing information that is greater than 2 bits.

Embodiment Seven

This embodiment mainly describes user behaviors in the case where there are overlapped symbols of PUCCHs carrying two different traffic types in the time domain.

Assuming that the two different traffic types are eMBB and URLLC, according to the difference of the control information carried by PUCCH, it can be divided into at least the situations below.

In the first case, the two PUCCHs carry eMBB HARQ-ACK and URLLC HARQ-ACK respectively.

In the second case, the two PUCCHs carry eMBB HARQ-ACK and URLLC CSI respectively.

In the third case, the two PUCCHs carry eMBB CSI and URLLC HARQ-ACK respectively.

In the fourth case, the two PUCCHs carry eMBB CSI and URLLC CSI respectively.

Optionally, a user uses the same method in the preceding four cases, and the method is, at least for overlapped symbols, discarding PUCCH carrying eMBB UCI, and sending PUCCH carrying URLLC UCI.

Optionally, a user uses the same method in the preceding cases 1, 3 and 4, and the method is, at least for overlapped symbols, discarding PUCCH carrying eMBB UCI, and sending PUCCH carrying URLLC UCI.

In the second case, the method is, at least for overlapped symbols, discarding PUCCH carrying URLLC CSI, and sending PUCCH carrying eMBB HARQ-ACK.

Optionally, a user uses the same method in the preceding cases 3 and 4, and the method is, at least for overlapped symbols, discarding PUCCH carrying eMBB UCI, and sending PUCCH carrying URLLC UCI.

Optionally, a user uses the same method in the preceding cases 1 and 2, and the method is to bind eMBB HARQ-ACK to 1 bit. In an embodiment, if the bit number of URLLC UCI is less than or equal to M, eMBB HARQ-ACK and URLLC UCI are jointly encoded. In an embodiment, if the bit number of URLLC UCI is greater than M, eMBB HARQ-ACK is mapped on URLLC PUCCH in a form of puncturing.

If a user needs to use PUCCH to send eMBB HARQ-ACK, URLLC CSI, URLLC HARQ-ACK information simultaneously, eMBB HARQ-ACK is bundled to 1 bit. If the user needs to use PUCCH to send eMBB CSI, URLLC CSI, URLLC HARQ-ACK information simultaneously, eMBB CSI is dropped. If the user needs to use PUCCH to send eMBB HARQ-ACK, eMBB CSI, URLLC CSI, URLLC HARQ-ACK information simultaneously, eMBB CSI is dropped and eMBB HARQ-ACK is bundled to 1 bit.

The preceding solution can be applied at least to the case where eMBB PUCCH and URLLC PUCCH have the same symbol starting point.

Embodiment Eight

Figure 10:
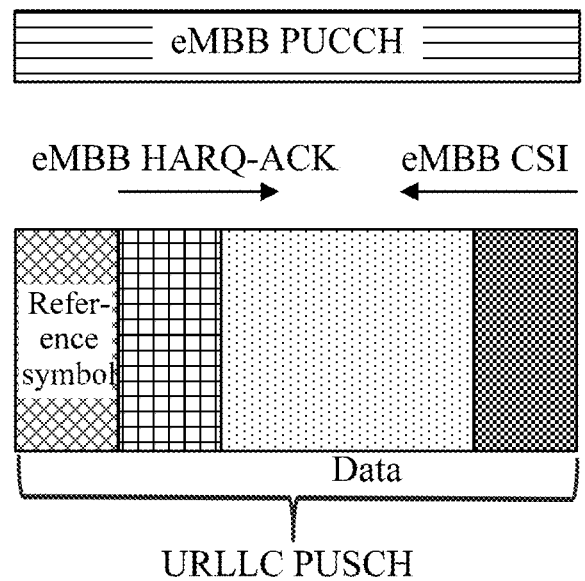
FIG. 10 illustrates a schematic diagram in which a terminal simultaneously sends eMBB PUCCH and URLLC PUCCH according to an embodiment of the present disclosure.

FIG. 10 illustrates a schematic diagram in which a user terminal needs to send simultaneously eMBB PUCCH and URLLC PUSCH. In the figure, CSI information of eMBB is preferentially mapped forward from the last symbol of PUSCH, where the CSI includes only CSI Part 1 or includes both CSI part 1 and CSI part 2. If the CSI includes both CSI part 1 and CSI part 2, HARQ-ACK information of eMBB is first mapped backward from the first non-DMRS symbol of PUSCH. If HARQ-ACK is of 1 to 2 bits, a manner of puncturing is used for mapping, and if the HARQ-ACK is greater than 2 bits, a manner of rate matching is used for mapping.

Alternatively, in the case where a user terminal needs to send eMBB PUCCH and URLLC PUSCH simultaneously, eMBB CSI information is dropped, and the HARQ-ACK information is mapped on PUSCH data symbols in a puncturing or rate matching manner.

In an embodiment, the HARQ-ACK information is mapped backward from the first data symbol of PUSCH or the HARQ-ACK information is mapped forward from the last data symbol of PUSCH.

Alternatively, in the case where the starting symbol of PUCCH is later than the starting symbol of PUSCH, the PUCCH is dropped and the PUSCH is sent. In an embodiment, the UCI carried by the PUCCH is not sent on PUSCH.

Embodiment Nine

If one PUCCH conflicts with one or more PUCCHs, or if one PUCCH conflicts with one or more PUSCHs, when the conditions below are met, UCI is multiplexed by a user terminal on one PUCCH or one PUSCH.

In condition 1, in all conflicting channels, the first symbol of the earliest PUCCH(s) or PUSCH(s) is not earlier than the (N1+X)th symbol after the last symbol of PDSCH(s), or the first symbol of the earliest PUCCH(s) or PUSCH(s) is not earlier than the (N1+X−1)th symbol after the last symbol of PDSCH(s).

In condition 2, in all conflicting channels, the first symbol of the earliest PUCCH(s) or PUSCH(s) is not earlier than the (N2+Y)th symbol after the last symbol of PDCCH(s), or the first symbol of the earliest PUCCH(s) or PUSCH(s) is not earlier than the (N2+Y−1)th symbol after the last symbol of PDCCH(s). The PDCCH(s) is a physical downlink control channel for scheduling uplink transmission, and the uplink transmission includes transmission of HARQ-ACK and/or PUSCH.

In an embodiment, if the conflicting channel does not meet the preceding timing requirements, a UE regard it as a kind of wrong scheduling.

In an embodiment, the X is determined by at least one or more of the conditions below.

Subcarrier spacing; UCI type; channel type carrying UCI sending; timing advance (TA), downlink data channel type; and time domain position of the last symbol of the downlink data channel.

In an embodiment, X=0 or 1, or 7−i, or 6−i, where i is a non-negative integer less than 7.

In an embodiment, X=0+TA or 1+TA, or 7−i+TA, or 6−i+TA, where i is a non-negative integer less than 7.

In an embodiment, X=1 or, 2 or 6−i, or 5−i, where i is a non-negative integer less than 7.

In an embodiment, X=d11+d12+d13, where d11, d12, and d13 meet at least one of the conditions below.

In the case where HARQ-ACK is sent on PUCCH, d11=0.

In the case where HARQ-ACK is sent on PUSCH, d11=1.

In the case where a UE is configured with multiple valid carriers, d12 is equal to the maximum time advance between multiple carriers; otherwise, d12=0.

In the case where PDSCH is mapping type A, and the last symbol is located at the ith symbol in the slot, d13=7−i, where I<7; otherwise, d13=0.

In an embodiment, the Y is determined by at least one or more of the conditions below.

Subcarrier spacing; UCI type; type of channel carrying UCI for sending; timing advance (TA), downlink data channel type; and whether the first symbol of the uplink data channel includes only a DMRS symbol.

In an embodiment, Y=0 or 1.

In an embodiment, Y=TA or 1+TA.

In an embodiment, Y=d21+d22, where if the first symbol of the PUSCH contains only DMRS symbols, then d21=0, otherwise d21=1; in the case where a UE is configured with multiple valid carriers, d22 is equal to the maximum time advance between multiple carriers; otherwise, d22=0.

Figure 11:
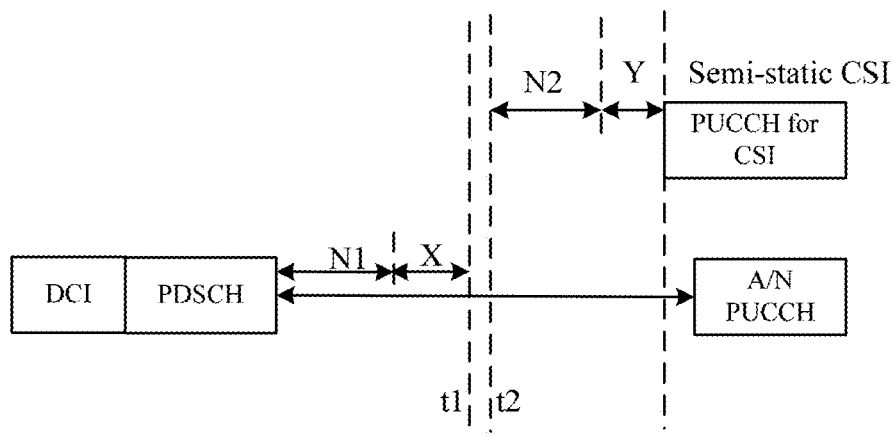
FIG. 11 is a schematic diagram illustrating conflicted sending of two PUCCHs in the time domain.

In an embodiment, as illustrated in FIG. 11, the end time of (N1+X) symbols after PDSCH scheduling is defined as t1, and the starting time of (N2+Y) symbols before PUCCH transmission is defined as t2. In the case where t1 is earlier than or is same as t2, the HARQ-ACK information of the PDSCH and the CSI information are jointly coded. In an embodiment, in the case where t1 is later than t2, the PUCCH that sends the HARQ-ACK is dropped.

In an embodiment, generally, if overlapped symbols of two PUCCHs exist in the time domain, the (N+Y) symbols before the start of the earliest PUCCH are later than the (N1+X) symbols after the last symbol of PDSCH that triggers another PUCCH, then the UCI carried on the two PUCCHs is jointly encoded.

In an embodiment, generally, if overlapped symbols of two PUCCHs exist in the time domain, the (N+Y) symbols before the start of the latest PUCCH are later than the (N1+X) symbols after the last symbol of PDSCH that triggers another PUCCH, then the uplink control information UCI carried on the two PUCCHs is jointly encoded.

Embodiment Ten

In an LTE system, the time transmission unit TTI length that supports shorter symbols, for example, a TTI length that supports 2 symbols or 3 symbols becomes a subslot. There are 6 subslots in a subframe. However, when the TTI length becomes shorter, the coverage of the PUCCH is greatly affected. A way to improve uplink coverage is to use repeated sending of subslot PUCCH. However, in the case where subslot PUCCH is repeated, if the subframe boundary is allowed to cross, the resource usage efficiency is affected, and problems are complicated when multiple uplink channels collide. Therefore, in the case where a user terminal is configured for a subslot PUCCH repetition, the repetition cannot cross the subframe boundary. For example, if the number of repetitions of subslot PUCCH is set to 4, the initial subslot PUCCH starts at subslot #0, then the subsequent subslot PUCCH is repeatedly sent on subslot #1, #2, and #3, respectively. If the initial subslot PUCCH starts at subslot #4, then subslot PUCCH can only be repeated once in subslot #5. That is, the actual number of repetitions is less than or equal to the configured number of repetitions. In an embodiment, when the user terminal is configured for the subslot PUCCH repetition, the repetition cannot cross slot boundary.

Figure 12:
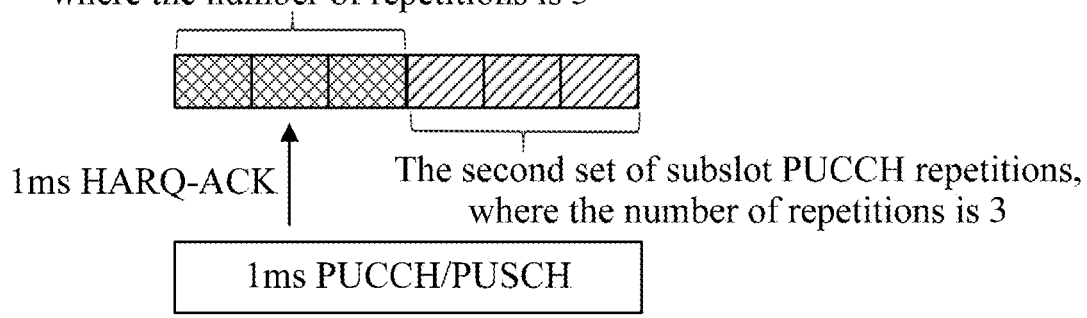
FIG. 12 is a schematic diagram illustrating 1 ms PUCCH/PUSCH repetitions and multiple sets of subslot PUCCH according to an embodiment of the present disclosure.

In an embodiment, if the 1 ms PUCCH/PUSCH repetition conflicts with multiple sets of subslot PUCCH repetitions, the 1 ms HARQ-ACK can be piggybacked to only the first set of subslot PUCCH repetitions. As illustrated in FIG. 12, two sets of subslot PUCCH repetitions (each set contains three repetitions) conflict with a 1 ms PUCCH/PUSCH. At this time, 1 ms HARQ-ACK is carried in the first subslot PUCCH repetition. Optionally, if 1 ms PUCCH/PUSCH carries CSI information, the CSI information is dropped. Alternatively, 1 ms HARQ-ACK can be piggybacked to all conflicting subslot PUCCH repetitions.

Figure 13:
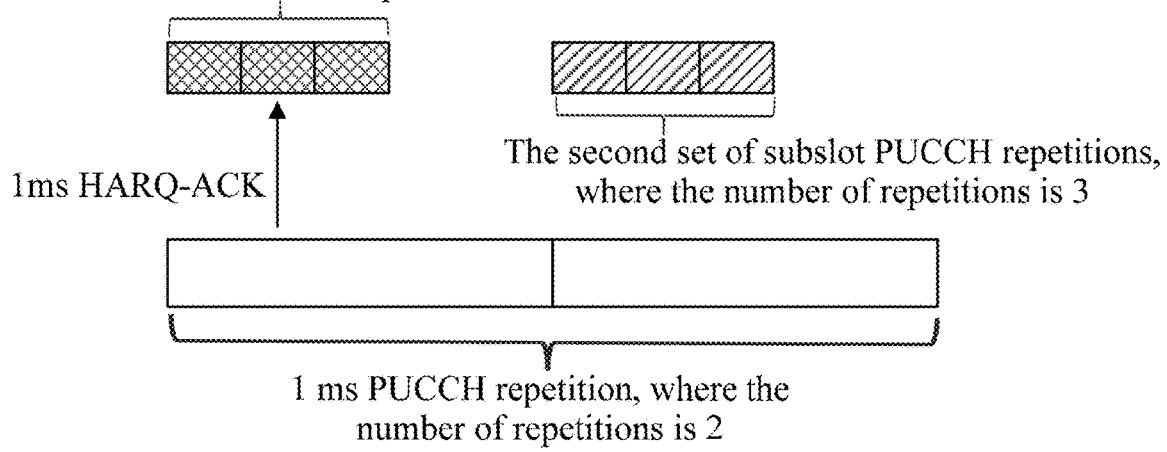
FIG. 13 illustrates a schematic diagram in which 1 ms PUCCH repetitions and multiple sets of subslot PUCCH repetitions conflict with each other according to an embodiment of the present disclosure.

In an embodiment, a subslot PUCCH repetition may conflict with 1 ms PUCCH/PUSCH repetitions. As illustrated in FIG. 13, a set of 1 ms TTI PUCCH repetitions (two repetitions) conflicts with two sets of subslot PUCCH repetitions. At this time, it needs to be defined that 1 ms HARQ-ACK can be piggybacked to only the first set of subslot PUCCH repetitions in the entire 1 ms PUCCH repetition. Alternatively, 1 ms HARQ-ACK can be piggybacked to all conflicting subslot PUCCH repetitions.

Figure 14:
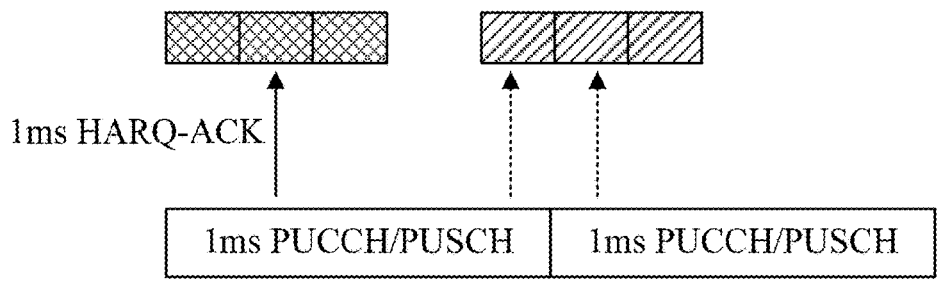
FIG. 14 illustrates a schematic diagram in which 1 ms PUCCH/PUSCH repetitions and multiple sets of subslot PUCCH repetitions conflict with each other according to an embodiment of the present disclosure.

In an embodiment, as illustrated in FIG. 14, if the subslot PUCCH repetition can cross the subframe or slot boundary, 1 ms HARQ-ACK can be piggybacked to only the first set of subslot PUCCH repetitions in the entire 1 ms PUCCH/PUSCH, and the first set of subslot PUCCH repetitions does not cross a subframe boundary; or, 1 ms HARQ-ACK can be piggybacked to only the first set of subslot PUCCH repetitions in the entire 1 ms PUCCH/PUSCH, the first set of subslot PUCCH repetitions does not cross the subframe boundary, and sending of the starting subslot PUCCH of the first set of subslot PUCCH repetitions is equal to or later than starting sending time of 1 ms PUCCH/PUSCH; or, 1 ms HARQ-ACK may be piggybacked to all conflicting subslot PUCCH repetitions. Alternatively, 1 ms HARQ-ACK may be piggybacked to all conflicting subslot PUCCH repetitions, but the sending of the starting subslot PUCCH of subslot PUCCH repetition is equal to or later than starting sending time of 1 ms PUCCH/PUSCH.

In an embodiment, if 1 ms PUCCH/PUSCH conflicts with a set of subslot PUCCH repetitions, and the initial sending time of subslot PUCCH repetition is earlier than sending of the 1 ms PUCCH/PUSCH, then subslot PUCCH repetition is sent, and 1 ms HARQ-ACK and/or CSI and/or SR are all dropped.

In an embodiment, in the case where a UE is configured to repeatedly send subslot PUCCH, the frequency hopping between repetitions may be enabled through network or disabled or fixed to always frequency hopping. In an embodiment, frequency hopping is performed between every two repetitions or only one frequency hopping is performed, and the number of repetitions included in the first frequency hopping is floor (K/2) or ceil (K/2), where floor is a round-down function, ceil is a round-up function, and K is the number of repetitions.

In an embodiment, in the case where a UE is configured to repeatedly send subslot PUCCH, if it is carried in a 3-symbol subslot, it is always sent in a shortened structure, that is, a 2-symbol PUCCH is always sent on the 3-symbol subslot.

Embodiment Eleven

Figure 15:
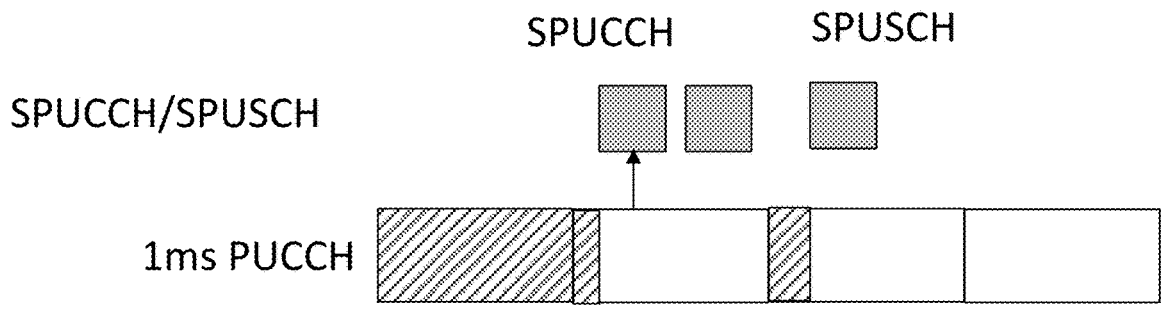
FIG. 15 illustrates a schematic diagram of an instance in which 1 ms PUCCH repetitions and SPUCCH/SPUSCH conflict with each other and a high-layer discard parameter is 2 according to an embodiment of the present disclosure.

In an LTE/LTE-A system, to enhance uplink coverage, 1 ms PUCCH can be configured to be repeatedly sent. Moreover, since a shortened TTI length is defined in the LTE/LTE-A system, 1 ms TTI scheduling and shortened TTI scheduling can be dynamically switched. As a result, a conflict that a user terminal needs to simultaneous send 1 ms PUCCH repetitions and Shortened PUCCH (SPUCCH)/Shortened PUSCH (SPUSCH) may occur. To solve this conflict, one solution is to discard the subsequent remaining 1 ms PUCCH repeated sending in the case where the number of 1 ms PUCCH repetitions that conflicts with SPUCCH/SPUSCH is equal to a discard parameter configured by a high layer. For example, if the configured number of the 1 ms PUCCH repetitions is 4, and the configured high-layer discard parameter is 2, then when conflict of the first 1 ms PUCCH occurs, a UE still sends the second PUCCH repetition, and when the second conflict occurs, sending of the subsequent PUCCH repetition is stopped. As illustrated in FIG. 15, the first 1 ms PUCCH is to be sent. In addition to discarding the conflicted second and third PUCCH, the fourth PUCCH transmission is also to be dropped. In the figure, whether and how much the parts (shadow parts), which is before the conflict, of the second and third PUCCH are sent is a problem of user terminal capability or implementation.

In an embodiment, in the case where there is HARQ-ACK for 1 ms PUCCH, one method is to discard HARQ-ACK; or, in the entire 1 ms PUCCH repetition, it is sent only on the first conflicting SPUCCH/SPUSCH, as illustrated by the arrow in FIG. 15; or, considering that the first 1 ms PUCCH sent in FIG. 15 and the subsequent HARQ-ACK piggybacked to SPUCCH/SPUSCH cannot be combined, and considering that the coverage of 1 ms PUCCH is inherently greater than that of sTTI, it may be considered that 1 ms HARQ-ACK is piggybacked to only the SPUCCH/SPUSCH that conflicts with the first 1 ms PUCCH, that is, if there is no SPUCCH/SPUSCH conflicting with the first 1 ms PUCCH, 1 ms HARQ-ACK is not piggybacked.

In an embodiment, other solutions to resolving conflicts between the 1 ms PUCCH repetition and SPUCCH/SPUSCH may be that for carriers configured with a shortened TTI, the 1 ms PUCCH repetition is not configured, and other cells need to be further restricted and cannot be configured with the 1 ms PUCCH repetition. That is, for all carriers, TTI shortening and 1 ms PUCCH repetition are not configured both.

In an embodiment, other solutions to resolving conflicts between the 1 ms PUCCH repetition and SPUCCH/SPUSCH may be that high-layer discard parameters are not configured, the overlapped 1 ms PUCCH is not sent, and the unoverlapped 1 ms PUCCH is sent. Moreover, in the entire sending time of the 1 ms PUCCH repetition, 1 ms HARQ-ACK is sent only on the first overlapped SPUCCH/SPUSCH, and CSI is dropped.

In one embodiment, other solutions to resolving conflicts between the 1 ms PUCCH repetition and SPUCCH/SPUSCH may be that high-layer parameters are not configured, as long as a conflict between the 1 ms PUCCH repetition and SPUCCH/SPUSCH occurs, the remaining 1 ms PUCCH that is not overlapped is not sent, and 1 ms HARQ-ACK is sent only on the first overlapped SPUCCH/SPUSCH, CSI is dropped or feedback is performed only on SPUCCH/SPUSCH that conflicts with the first 1 ms PUCCH, that is, if there is no SPUCCH/SPUSCH conflict with the first PUCCH, 1 ms HARQ-ACK is not piggybacked. The first PUCCH is the first sending in sending of the 1 ms PUCCH repetition.

In an embodiment, the preceding scheme of assuming that the 1 ms PUCCH repetition and SPUCCH/SPUSCH conflict with each other can also be used for the conflict between the 1 ms PUCCH repetition and SPUCCH/SPUSCH.

Embodiment Twelve

In an LTE/LTE-A system, a shortened TTI 2 symbols or 3 symbols or 7 symbols is defined, and 1 ms TTI scheduling and shortened TTI scheduling can be dynamically switched. Therefore, it may happen that a user terminal needs to send 1 ms PUCCH/PUSCH and the SR carried on the shortened TTI simultaneously. If there is UCI information carried on PUCCH/PUSCH, 1 ms PUCCH/PUSCH is dropped. One solution is to drop the 1 ms UCI message; or drop SR and send 1 ms PUCCH/PUSCH. One solution is to discard 1 ms CSI, but HARQ-ACK information and SR information are sent on the shortened TTI. In an embodiment, if a user does not have HARQ-ACK feedback for the Shortened PDSCH (SPDSCH) at this time, the user may not have resources for simultaneously sending HARQ-ACK information and SR information on the shortened TTI. In an embodiment, a manner is that the base station is configured with PUCCH resources dedicated to sending SR and 1 ms HARQ-ACK for shortened TTI; or in the case where the shortened TTI is 2-symbol or 3-symbol TTI, since the base station configures 4 SR resources for a UE, a manner is that the user terminal binds 1 ms HARQ-ACK to 1 bit (if it is 1 bit, there is no need to bind, and if it is greater than 1 bit, it needs to be bundled to 1 bit), and then uses 4 SR resources to send SR and 1-bit HARQ-ACK. For example, two SR resources are used to send HARQ-ACK and valid positive SR, and the other two SR resources are used to send HARQ-ACK and invalid negative SR. In an embodiment, another manner is that for a single carrier, the user terminal binds 1 ms HARQ-ACK to 1 bit (if it is 1 bit, it does not need to be bundled, and if it is greater than 1 bit, it needs to be bundled to 1 bit), and then use 4 SR resources to send SR and 1-bit HARQ-ACK. However, in the case where the user is configured with multiple carriers, the base station configures PUCCH resources dedicated to sending SR and 1 ms HARQ-ACK for shortened TTI, and the SR and 1 ms HARQ-ACK are sent on the resources.

Based on the same or similar concept as the preceding embodiments, an embodiment of the present disclosure further provides an apparatus for signal transmission disposed on a UE. The apparatus for signal transmission according to the present disclosure includes a channel overlap control unit configured to determine the sending mode of multiple uplink channels in the case where overlapped symbols of the uplink channels exist in the time domain; and a sending unit configured to send uplink signals carried by the uplink channels according to the determined sending mode.

In the embodiment of the present disclosure, the channel overlap control unit determines the sending mode of multiple uplink channels according to at least one of the following: a starting symbol time of the uplink channel; a number of the uplink channel; a traffic type corresponding to information carried by the uplink channel; a bit number of information carried by the uplink channel; a time domain length of information carried by the uplink channel; and a trigger time of information carried by the uplink channel.

The multiple uplink channels include at least one PUCCH and at least one uplink data channel PUSCH, the multiple uplink channels include multiple PUCCHs, or the multiple uplink channels include multiple PUSCHs.

The sending mode of the uplink channels is determined by the channel overlap control unit in the following manner: determining whether the UCI in PUCCH includes only HARQ-ACK, and in the case where UCI includes only HARQ-ACK and the length of HARQ-ACK is of 1 to 2 bits, determining that the sending mode is to carry HARQ-ACK message on PUSCH.

In the embodiment of the present disclosure, in a case where overlapped symbols of a PUCCH and a PUSCH exist in the time domain and the starting symbols are different, and the UCI contains only a 1-bit to 2-bit HARQ-ACK message, the sending unit carries and sends the HARQ-ACK message on the PUSCH.

In the embodiment of the present disclosure, the UCI is sent on PUSCH in a manner of puncturing.

Preferably, the sending mode of the uplink channels is determined by the channel overlap control unit in the following manner: determining the number of resources occupied by HARQ-ACK message transmitted on PUSCH, in the case where the number of resources occupied by HARQ-ACK message transmitted on PUSCH is less than or equal to the threshold X1, determining that the sending mode is to carry and send HARQ-ACK message on the PUSCH, otherwise, determining that the sending mode is to carry and send HARQ-ACK message on the PUCCH.

In the embodiment of the present disclosure, overlapped symbols of the one PUCCH and the one PUSCH exist in the time domain and the starting symbols are different. In the case where the UCI contains only a 1-bit to 2-bit HARQ-ACK message, and the number of resources occupied by the HARQ-ACK message transmitted on PUSCH is less than or equal to the threshold X1, the HARQ-ACK message is carried and sent on the PUSCH, otherwise, the HARQ-ACK message is carried and sent on the PUCCH.

In the embodiment of the present disclosure, in the case where the PUCCH and the PUSCH have different starting symbols and in the case where the UCI contains only an HARQ-ACK message of more than 2 bits, the HARQ-ACK message is bundled to 1 bit or 2 bits and transmitted on the PUSCH; or, the PUCCH is sent and the PUSCH is dropped.

In the embodiment of the present disclosure, in the case where the one PUCCH and the one PUSCH have different starting symbols and in the case where the UCI carried on the PUCCH contains an HARQ-ACK message and/or a CSI message and/or an SR message, the PUCCH is sent and the PUSCH is dropped.

In the embodiment of the present disclosure, in the case where UCI is sent on PUSCH, the symbols that can be used for UCI mapping are defined as non-DMRS symbols in the overlapped symbols of PUCCH and PUSCH.

In the embodiment of the present disclosure, in the case where UCI is sent on the PUSCH, at least one of the following conditions should be satisfied: the starting symbol of the PUCCH is equal to the starting symbol of the PUSCH or the starting symbol of the PUCCH is X1 symbols earlier than the starting symbol of the PUSCH, and X1 is greater than or equal to land less than 14; the number of time domain symbols included in the PUCCH is equal to or less than the number of time domain symbols included in the PUSCH; the number of overlapped symbols of the PUCCH and PUSCH is greater than a predetermined fixed value X2 or the number of non-DMRS symbols in the overlapped symbols of the PUCCH and PUSCH is greater than a predetermined fixed value X3; or the number of time domain symbols included in the PUSCH is greater than a predetermined fixed value X4.

Each of X1, X2, X3, X4 is an integer greater than or equal to 1 and less than 14.

In the embodiment of the present disclosure, in the case where the UCI message is sent on PUCCH, at least one of the conditions below should further be met.

The number of time domain symbols included in the PUCCH is equal to or less than the number of time domain symbols included in the PUSCH.

The starting symbol of the PUCCH is later than the starting symbol of the PUSCH.

The priority of the traffic type corresponding to the PUCCH is higher than the priority of the traffic type corresponding to the PUSCH.

Frequency domain resources used for sending the PUCCH are frequency domain resources of the PUSCH or a subset of the frequency domain resources of the PUSCH.

In the embodiment of the present disclosure, if the frequency hopping of the PUCCH is enabled, the frequency domain resources used by PUCCH are located on the upper and lower resources in frequency domain resources of the PUSCH.

In the embodiment of the present disclosure, overlapped symbols of the multiple PUCCHs and the one PUSCH exist in the time domain, and at least one of the multiple PUCCHs is sent, and the PUSCH is dropped.

In the embodiment of the present disclosure, the number of symbols of at least one PUCCH in the multiple PUCCHs is equal to or less than the number of symbols of the PUSCH.

In the embodiment of the present disclosure, the priority of the traffic type corresponding to information carried by the PUCCH is higher than the priority of the traffic type corresponding to information carried by the PUSCH.

The example below is applied to an application scenario where a UE sends one PUSCH and one PUCCH.

A channel overlap control unit determines the sending mode of PUSCH and PUCCH according to the trigger time of PUSCH and PUCCH.

In the embodiment of the present disclosure, a UE receives the uplink scheduling of PUSCH of the first traffic type in t1 period, receives PDSCH of the second traffic type in t2 period or receives the scheduling of PDSCH of the second traffic type in t2 period, where the HARQ-ACK message corresponding to the PDSCH and the PUSCH corresponding to the uplink scheduling both need to be sent in a to period.

In other words, the trigger time of PUCCH that a UE needs to send in tn period is t1, and the trigger time of PUSCH is t2.

In the embodiment of the present disclosure, in the case where t1 period is after the t2 period or same as the t2 period, a UE sends, in tn period according to the first predetermined sending mode, the HARQ-ACK message corresponding to PDSCH and PUSCH corresponding to the uplink scheduling.

In the embodiment of the present disclosure, in the case where t1 period is before t2, a UE sends, in the tn period according to a second predetermined sending mode, the HARQ-ACK message corresponding to PDSCH and PUSCH corresponding to the uplink scheduling.

In the embodiment of the present disclosure, the priority of the first traffic type is different from the priority of the second traffic type.

In the embodiment of the present disclosure, the first sending mode is determined by a channel overlap control unit in at least one of the manners below.

In manner 1, the HARQ-ACK message is multiplexed in the uplink data of the first traffic type in a manner of puncturing; or in manner 2, the HARQ-ACK message is multiplexed in the uplink data of the first traffic type in a rate matching manner.

In the embodiment of the present disclosure, the first sending mode includes manner 1 and manner 2.

In the case where HARQ-ACK message is a 1 to 2-bit message, manner 1 is used for transmission.

In the case where HARQ-ACK message is a message greater than 2 bits, manner two is used for transmission.

In the embodiment of the present disclosure, the second sending mode is determined by a channel overlap control unit in the following manner: sending the HARQ-ACK message on the overlapped symbols of the HARQ-ACK message and the uplink data of the first traffic type, and discarding the uplink data of the first traffic type on the overlapped symbols of the HARQ-ACK message and uplink data of the first traffic type.

In the embodiment of the present disclosure, overlapped symbols of one PUSCH and two PUCCHs exist in the time domain, and UCI in the at least one PUCCH is carried on the PUSCH.

In the embodiment of the present disclosure, PUSCH is divided into two regions, which are defined as the first region and the second region, and UCI carried by the two PUCCHs are multiplexed into the two PUSCH regions for sending.

In the embodiment of the present disclosure, a first predefined resource and a second predefined resource are respectively defined in the first and second regions, the first predefined resource is determined by a 1-bit or 2-bit UCI, and the second predefined resource is determined by a 2-bit UCI.

In the embodiment of the present disclosure, a predefined resource is defined in PUSCH, where the predefined resource is determined by N-bit UCI, where N=2 or N=3 or N=4.

In the embodiment of the present disclosure, the N should meet at least one of the conditions below.

In the case where N=2, HARQ-ACK of the first traffic type occupies 1 bit, and HARQ-ACK of the second traffic type occupies 1 bit; or both HARQ-ACK of the first traffic type occupies 2 bits.

In the case where N=3, HARQ-ACK of the first traffic type occupies 1 bit, and HARQ-ACK of the second traffic type occupies 2 bits; or the N=2, HARQ-ACK of the first traffic type occupies 2 bits, and HARQ-ACK of the second traffic type occupies 1 bit.

In the case where N=4, HARQ-ACK of the first traffic type occupies 2 bits, and HARQ-ACK of the second traffic type occupies 2 bits.

The priority of the first traffic type is higher than that of the second traffic type.

In the embodiment of the present disclosure, the traffic types corresponding to UCI carried by the PUCCHs are different.

Based on the same or similar concepts as the preceding embodiments, the embodiment of the present disclosure further provides a terminal, and the terminal includes any signal transmission device of the embodiments of the present disclosure.

Based on the same or similar concepts as the preceding embodiments, the embodiment of the present disclosure further provides a terminal including a memory, a processor and a computer program stored on the memory and running on the processor, where the processor implements the processing of any method for signal transmission of the embodiment of the present disclosure when executing the computer program.

Based on the same or similar concepts as the preceding embodiments, the embodiment of the present disclosure further provides a computer-readable storage medium on which a computer program is stored, and when the computer program is executed by a processor, the processing of any method for signal transmission of the embodiment of the present disclosure is implemented.

It is to be noted that the preceding embodiments are only for facilitating the understanding of those skilled in the art, and are not used to limit the scope of the present disclosure. Without departing from the inventive concept of the present disclosure, any apparent replacement and improvement made by a person skilled in the art to the present disclosure is within the scope of the present disclosure.

What is claimed is:

1. A method for signal transmission, comprising:
   determining, by a user equipment (UE), a sending mode of a plurality of uplink channels in a case where overlapped symbols of the plurality of uplink channels exist in time domain; and
   sending uplink signals carried by the plurality of uplink channels according to the determined sending mode;
   the plurality of uplink channels comprises at least one physical uplink control channel, PUCCH, and at least one physical uplink shared channel, PUSCH; the plurality of uplink channels comprises a plurality of PUCCHs; or the plurality of uplink channels comprises a plurality of PUSCHs;

wherein the UE receives uplink scheduling of PUSCH of a first traffic type in a t1 period and receives a physical downlink shared channel, PDSCH, of a second traffic type in a t2 period or receives scheduling of PDSCH of the second traffic type in the t2 period, wherein a hybrid automatic repeat request acknowledgement, HARQ-ACK, message corresponding to the PDSCH and a PUSCH corresponding to the uplink scheduling are both required to be sent in a tn period;

wherein the plurality of uplink channels comprises one PUCCH and one PUSCH; overlapped symbols of the one PUCCH and the one PUSCH exist in the time domain and a starting symbol of the one PUCCH and a starting symbol of the one PUSCH are different, and in a case where UCI contains only a HARQ-ACK message of 1 to 2 bits, in response to a number of resources occupied by the HARQ-ACK message transmitted on the one PUSCH less than or equal to a threshold X1, the HARQ-ACK message is carried and sent on the one PUSCH, otherwise, the HARQ-ACK message is carried and sent on the one PUCCH;

wherein in a case where the UCI message is sent on the one PUCCH, at least one of the following conditions is satisfied:
a number of time domain symbols comprised in the one PUCCH is equal to or less than a number of time domain symbols comprised in the one PUSCH; the starting symbol of the one PUCCH is later than the starting symbol of the one PUSCH; a priority of a traffic type corresponding to the one PUCCH is higher than a priority of a traffic type corresponding to the one PUSCH; or frequency domain resources used for sending the one PUCCH are frequency domain resources of the one PUSCH or a subset of frequency domain resources of the one PUSCH;

wherein in response to enabling frequency hopping of the one PUCCH, the frequency domain resources used by the one PUCCH are located on upper and lower resources in the frequency domain resources of the one PUSCH.

2. The method for the signal transmission of claim 1, wherein the plurality of uplink channels comprises one PUCCH and one PUSCH; and
overlapped symbols of the one PUCCH and the one PUSCH exist in the time domain and a starting symbol of the one PUCCH and a starting symbol of the one PUSCH are different, and in a case where uplink control information (UCI) contains only a hybrid automatic repeat request acknowledgement (HARQ-ACK) message of 1 to 2 bits, the HARQ-ACK message is carried and sent on the one PUSCH.

3. The method for the signal transmission of claim 2, wherein the UCI is sent on the one PUSCH in a manner of puncturing.

4. The method for the signal transmission of claim 1, wherein the plurality of uplink channels comprises one PUCCH and one PUSCH; and wherein
in a case where a starting symbol of the one PUCCH and a starting symbol of the one PUSCH are different and UCI contains only an HARQ-ACK message of more than 2 bits, the HARQ-ACK message is bundled to 1 bit or 2 bits and is carried and sent on the one PUSCH; otherwise, the one PUCCH is sent and the one PUSCH is dropped.

5. The method for the signal transmission of claim 1, wherein the plurality of uplink channels comprise one PUCCH and one PUSCH; in a case where a starting symbol of the one PUCCH and a starting symbol of the one PUSCH are different and UCI contains at least one of an HARQ-ACK message, a channel state information (CSI) message, or an scheduling request (SR) message, the one PUCCH is sent and the one PUSCH is dropped.

6. The method for the signal transmission of claim 2, wherein in a case where the UCI is sent on the one PUSCH, a symbol capable of being used for UCI mapping is defined as a non-DMRS symbol in the overlapped symbols of the one PUCCH and the one PUSCH.

7. The method for the signal transmission of claim 2, wherein in a case where the UCI is sent on the one PUSCH, at least one of the following conditions is satisfied:
the starting symbol of the one PUCCH is equal to the starting symbol of the one PUSCH or the starting symbol of the one PUCCH is X1 symbols earlier than the starting symbol of the one PUSCH, wherein X1 is an integer greater than or equal to 1 and less than 14;
a number of time domain symbols comprised in the one PUCCH is equal to or less than a number of time domain symbols comprised in the one PUSCH;
a number of the overlapped symbols of the one PUCCH and the one PUSCH is greater than a predetermined fixed value X2, wherein X2 is an integer greater than or equal to 1 and less than 14; or a number of non-DMRS symbols in the overlapped symbols of the one PUCCH and the one PUSCH is greater than a predetermined fixed value X3, wherein X3 is an integer greater than or equal to 1 and less than 14; or
a number of time domain symbols comprised in the one PUSCH is greater than a predetermined fixed value X4, wherein X4 is an integer greater than or equal to 1 and less than 14.

8. The method for the signal transmission of claim 1, wherein the plurality of uplink channels comprises a plurality of PUCCHs and one PUSCH; overlapped symbols of the plurality of PUCCHs and the one PUSCH exist in the time domain, at least one of the plurality of PUCCHs is sent and the one PUSCH is dropped.

9. The method for the signal transmission of claim 2, wherein a priority of a traffic type corresponding to information carried by the PUCCH is higher than a priority of a traffic type corresponding to information carried by the PUSCH.

10. The method for the signal transmission of claim 1, wherein overlapped symbols of one PUSCH and two PUCCHs exist in the time domain; and UCI of at least one PUCCH of the two PUCCHs is carried on the one PUSCH.

11. The method for the signal transmission of claim 10, wherein the PUSCH is divided into two regions, which are defined as a first region and a second region, and UCI carried by each of the two PUCCHs is multiplexed and sent on a respective one of the two PUSCH regions; and
wherein the method further comprises: defining a first predefined resource and a second predefined resource in the first region and the second region respectively, wherein the first predefined resource is determined by 1-bit or 2-bit UCI, and the second predefined resource is determined by 2-bit UCI.

12. The method for the signal transmission of claim 10, further comprising: defining a predefined resource in the one PUSCH, wherein the predefined resource is determined by N-bit UCI, where N=2, N=3 or N=4;
wherein the N satisfies at least one of the following conditions:

in a case where N=2, HARQ-ACK of a first traffic type occupies 1 bit and HARQ-ACK of a second traffic type occupies 1 bit, or the HARQ-ACK of the first traffic type occupies 2 bits;

in a case where N=3, the HARQ-ACK of the first traffic type occupies 1 bit and the HARQ-ACK of the second traffic type occupies 2 bits; or N=3, the HARQ-ACK of the first traffic type occupies 2 bits and the HARQ-ACK of the second traffic type occupies 1 bit; or in a case where N=4, the HARQ-ACK of the first traffic type occupies 2 bits, and the HARQ-ACK of the second traffic type occupies 2 bits;

wherein a priority of the first traffic type is higher than a priority of the second traffic type.

13. The method for the signal transmission of claim 1, wherein in a case where the plurality of uplink channels comprises a plurality of PUCCHs, traffic types carried by the plurality of PUCCHs are enhance mobile broadband, eMBB, and ultra-reliable low latency communication, URLLC;

wherein if the UE needs to use PUCCH to send eMBB channel state information, eMBB CSI, URLLC CSI, URLLC HARQ-ACK information simultaneously, eMBB CSI is dropped.

14. The method for the signal transmission of claim 13, wherein if the UE needs to use PUCCH to send eMBB HARQ-ACK, eMBB CSI, URLLC CSI, URLLC HARQ-ACK information simultaneously, eMBB CSI is dropped and eMBB HARQ-ACK is bundled to 1 bit.

15. The method for the signal transmission of claim 1, wherein in a case where the plurality of uplink channels comprises at least one PUCCH and at least one PUSCH, if the UE needs to send eMBB PUCCH and URLLC PUSCH simultaneously, eMBB CSI information is dropped, and eMBB HARQ-ACK information is mapped on PUSCH data symbols in a puncturing or rate matching manner.

16. A user equipment, UE, comprising a memory, a processor and a computer program stored on the memory and capable of running on the processor, wherein the processor is configured to, when executing the computer program, perform processing of the method of claim 1.

17. A non-transitory computer-readable storage medium, on which a computer program is stored, wherein the computer program is configured to, when executed by a processor, cause the processor to perform the following steps:

determining a sending mode of a plurality of uplink channels in a case where overlapped symbols of the plurality of uplink channels exist in time domain; and sending uplink signals carried by the plurality of uplink channels according to the determined sending mode;

the plurality of uplink channels comprises at least one physical uplink control channel, PUCCH, and at least one physical uplink shared channel, PUSCH; the plurality of uplink channels comprises a plurality of PUCCHs; or the plurality of uplink channels comprises a plurality of PUSCHs;

wherein the UE receives uplink scheduling of PUSCH of a first traffic type in a t1 period and receives a physical downlink shared channel, PDSCH, of a second traffic type in a t2 period or receives scheduling of PDSCH of the second traffic type in the t2 period, wherein a hybrid automatic repeat request acknowledgement, HARQ-ACK, message corresponding to the PDSCH and a PUSCH corresponding to the uplink scheduling are both required to be sent in a to period;

wherein the plurality of uplink channels comprises one PUCCH and one PUSCH; overlapped symbols of the one PUCCH and the one PUSCH exist in the time domain and a starting symbol of the one PUCCH and a starting symbol of the one PUSCH are different, and in a case where UCI contains only a HARQ-ACK message of 1 to 2 bits, in response to a number of resources occupied by the HARQ-ACK message transmitted on the one PUSCH less than or equal to a threshold X1, the HARQ-ACK message is carried and sent on the one PUSCH, otherwise, the HARQ-ACK message is carried and sent on the one PUCCH;

wherein in a case where the UCI message is sent on the one PUCCH, at least one of the following conditions is satisfied:

a number of time domain symbols comprised in the one PUCCH is equal to or less than a number of time domain symbols comprised in the one PUSCH; the starting symbol of the one PUCCH is later than the starting symbol of the one PUSCH; a priority of a traffic type corresponding to the one PUCCH is higher than a priority of a traffic type corresponding to the one PUSCH; or frequency domain resources used for sending the one PUCCH are frequency domain resources of the one PUSCH or a subset of frequency domain resources of the one PUSCH:

wherein in response to enabling frequency hopping of the one PUCCH, the frequency domain resources used by the one PUCCH are located on upper and lower resources in the frequency domain resources of the one PUSCH.

* * * * *

UNITED STATES PATENT AND TRADEMARK OFFICE
CERTIFICATE OF CORRECTION

PATENT NO. : 11,627,599 B2
APPLICATION NO. : 17/054484
DATED : April 11, 2023
INVENTOR(S) : Xianghui Han It is certified that error appears in the above-identified patent and that said Letters Patent is hereby corrected as shown below:

In the Specification

Column 7, Line 27, delete "UCI may be eMBB HARQ-ACK and/or eMBB CSI." and insert the same on Column 7, Line 26, as a continuation of the same paragraph.

Column 13, Line 45-47, delete "PUCCH time domain symbol is the same as or different from the starting point of eMBB PUSCH time domain symbol." and insert the same on Column 13, Line 44, as a continuation of the same paragraph.

Column 13, Line 62-65, delete "Assuming that the two different traffic types are eMBB and URLLC, according to the difference of the control information carried by PUCCH, it can be divided into at least the situations below." and insert the same on Column 13, Line 61, as a continuation of the same paragraph.

Column 21, Line 15 (approx.), delete "to" and insert -- tn --.

In the Claims

Column 26, Line 8, Claim 17, delete "tl" and insert -- t1 --.

Column 26, Line 15 (approx.), Claim 17, delete "to" and insert -- tn --.

Column 26, Line 43, Claim 17, delete "PUSCH:" and insert -- PUSCH; --.

Signed and Sealed this
First Day of August, 2023

Katherine Kelly Vidal
*Director of the United States Patent and Trademark Office*